United States Patent
Song et al.

(10) Patent No.: US 10,430,763 B1
(45) Date of Patent: Oct. 1, 2019

(54) APPARATUS, METHOD AND SYSTEM FOR CLASSIFYING FREELANCERS

(71) Applicant: Upwork Inc., Mountain View, CA (US)

(72) Inventors: Sunny SunMin Song, Los Altos, CA (US); Jonathan Paul Diller, Soquel, CA (US)

(73) Assignee: Upwork, Inc., Mountain View, CA (US)

( * ) Notice: Subject to any disclaimer, the term of this patent is extended or adjusted under 35 U.S.C. 154(b) by 356 days.

(21) Appl. No.: 14/749,383

(22) Filed: Jun. 24, 2015

Related U.S. Application Data

(63) Continuation-in-part of application No. 14/628,095, filed on Feb. 20, 2015.

(60) Provisional application No. 62/018,479, filed on Jun. 27, 2014, provisional application No. 62/138,911, filed on Mar. 26, 2015, provisional application No. 61/942,558, filed on Feb. 20, 2014.

(51) Int. Cl.
| | |
|---|---|
| *G06Q 10/10* | (2012.01) |
| *G06F 16/23* | (2019.01) |
| *G06F 16/28* | (2019.01) |

(52) U.S. Cl.
CPC ........ *G06Q 10/1053* (2013.01); *G06F 16/23* (2019.01); *G06F 16/285* (2019.01)

(58) Field of Classification Search
CPC ............ G06Q 10/00–50/00; G06F 1/00–23/00
USPC ................................................ 705/7.11–7.42
See application file for complete search history.

(56) References Cited

U.S. PATENT DOCUMENTS

| | | | | |
|---|---|---|---|---|
| 6,385,620 | B1 * | 5/2002 | Kurzius | G06Q 10/10 |
| 6,618,734 | B1 * | 9/2003 | Williams | G06Q 10/06 |
| 6,662,194 | B1 * | 12/2003 | Joao | G06Q 10/10 |
| | | | | 705/1.1 |
| 6,735,570 | B1 | 5/2004 | Lacy | |
| 6,859,523 | B1 * | 2/2005 | Jilk | G06Q 10/06 |
| | | | | 379/265.01 |
| 7,096,193 | B1 | 8/2006 | Beaudoin | |
| 7,466,810 | B1 | 12/2008 | Quon | |
| 7,505,919 | B2 * | 3/2009 | Richardson | G06Q 10/06 |
| | | | | 705/7.14 |

(Continued)

OTHER PUBLICATIONS

Muhl, Charles J. "What Is an Employee—The Answer Depends on the Federal Law." Monthly Lab. Rev. 125 (2002): 3.*

(Continued)

*Primary Examiner* — Alan S Miller
(74) *Attorney, Agent, or Firm* — Haverstock & Owens LLP

(57) ABSTRACT

Embodiments of the present invention are directed to a classification engine that classifies freelancers in one of a plurality of categories. The classification engine captures data to perform a first classification evaluation of each engaged freelancer. The first classification evaluation is used to drive different levels of onboarding to ensure appropriate onboarding tasks are completed for each engaged freelancer before the freelancer starts work for a client. Depending on the level of onboarding, the classification engine either uses the first classification evaluation to make a determination regarding the classification of the freelancer or captures additional data to perform a second classification evaluation to make the determination. The classification engine eliminates delays, manual workarounds and helps scale work with enterprise clients.

15 Claims, 23 Drawing Sheets

(56) References Cited

U.S. PATENT DOCUMENTS

| | | | | |
|---|---|---|---|---|
| 8,024,670 | B1* | 9/2011 | Rahmatian | G06Q 10/00 705/320 |
| 8,156,051 | B1* | 4/2012 | Shah | G06Q 10/10 705/1.1 |
| 8,504,403 | B2* | 8/2013 | Deich | G06Q 10/06 705/7.12 |
| 8,517,742 | B1* | 8/2013 | Johnson | G06Q 10/00 434/322 |
| 8,682,683 | B2* | 3/2014 | Ananian | G06Q 10/1053 705/1.1 |
| 8,843,388 | B1* | 9/2014 | Westfall | G06Q 10/063112 705/7.13 |
| 9,020,271 | B2 | 4/2015 | Deolalikar et al. | |
| 9,454,576 | B1* | 9/2016 | Kapoor | G06F 17/30507 |
| 2001/0034630 | A1 | 10/2001 | Mayer | |
| 2002/0052773 | A1* | 5/2002 | Kraemer | G06Q 10/063112 705/7.14 |
| 2002/0103687 | A1* | 8/2002 | Kipling | G06Q 10/06 705/7.14 |
| 2003/0004738 | A1* | 1/2003 | Chandar | G06Q 10/10 705/321 |
| 2003/0014294 | A1* | 1/2003 | Yoneyama | G06Q 10/063112 705/7.14 |
| 2003/0050811 | A1* | 3/2003 | Freeman, Jr. | G06Q 10/063112 705/7.14 |
| 2003/0086608 | A1* | 5/2003 | Frost | G01N 15/147 382/173 |
| 2003/0191684 | A1 | 10/2003 | Lumsden | |
| 2003/0212246 | A1* | 11/2003 | Eleveld | B01J 27/26 528/409 |
| 2004/0243428 | A1* | 12/2004 | Black | G06Q 10/10 705/320 |
| 2005/0033633 | A1* | 2/2005 | LaPasta | G06Q 10/10 434/362 |
| 2005/0222907 | A1 | 10/2005 | Pupo | |
| 2006/0080116 | A1* | 4/2006 | Maguire | G06Q 10/06 705/1.1 |
| 2006/0143228 | A1* | 6/2006 | Odio-Paez | G06Q 10/107 |
| 2006/0177041 | A1 | 8/2006 | Warner et al. | |
| 2006/0284838 | A1* | 12/2006 | Tsatalos | G06Q 10/0637 345/156 |
| 2007/0192130 | A1 | 8/2007 | Sandhu | |
| 2007/0233510 | A1* | 10/2007 | Howes | G06Q 30/0601 705/26.1 |
| 2008/0059267 | A1* | 3/2008 | Hamilton | G06Q 10/00 705/7.15 |
| 2008/0059523 | A1 | 3/2008 | Schmidt | |
| 2009/0011395 | A1 | 1/2009 | Schmidt | |
| 2009/0055404 | A1 | 2/2009 | Heiden | |
| 2009/0150386 | A1* | 6/2009 | Lichtblau | G06Q 30/02 |
| 2010/0017253 | A1 | 1/2010 | Butler | |
| 2010/0161503 | A1* | 6/2010 | Foster | G06Q 10/10 705/321 |
| 2011/0106762 | A1* | 5/2011 | Dane | G06F 21/6227 707/636 |
| 2011/0208665 | A1* | 8/2011 | Hirsch | G06Q 10/1053 705/321 |
| 2012/0143952 | A1* | 6/2012 | von Graf | G06Q 10/10 709/204 |
| 2012/0150761 | A1* | 6/2012 | Ananian | G06Q 10/1053 705/321 |
| 2012/0265770 | A1 | 10/2012 | Desjardins | |
| 2012/0290365 | A1 | 11/2012 | Bramlett, Jr. | |
| 2014/0074738 | A1 | 3/2014 | Thankappan et al. | |
| 2014/0244333 | A1* | 8/2014 | Bournas | G06Q 10/063116 705/7.16 |
| 2014/0377723 | A1* | 12/2014 | Strong | G09B 19/0053 434/118 |
| 2015/0206080 | A1 | 7/2015 | Izaguirre | |
| 2016/0012135 | A1 | 1/2016 | Wang et al. | |

OTHER PUBLICATIONS

Barton, Lisa Horwedel. "Reconciling the independent contractor versus employee dilemma: a discussion of current developments as they relate to employee benefit plans." Cap. UL Rev. 29 (2001): 1079.*

Moran, Jenna Amato. "Independent Contractor or Employee-Misclassification of Workers and Its Effect on the State." Buff. Pub. Int. LJ 28 (2009): 105.*

Webb, Teresa J., et al. "An empirical assist in resolving the classification dilemma of workers as either employees or independent contractors." Journal of Applied Business Research (JABR) 24.2 (2011).*

Wood, Robert W. "Defining Employees and Independent Contractors." Bus. L. Today 17 (2007): 45.*

* cited by examiner

| Classification Review Calculator | Valve | Attribute Present |
|---|---|---|
| Geography | | |
| US0 | 8 | N |
| ⋮ | | |
| INT3 | -2 | N |
| Project Amount | | |
| $100,000 or above | 3 | N |
| ⋮ | | |
| $1 to $9,999 | 0 | Y |
| Project Duration | | |
| 1YR+ (or ongoing) | 2 | N |
| 6MO+ | 1 | N |
| <6MO | 0 | Y |
| Project Type | | |
| Hourly | 1 | N |
| ⋮ | | |
| Fixed Price - 5 or more Milestones | 2 | Y |
| Authorized Hours per Week | | |
| 20+ | 3 | N |
| 10 to 19 | 1 | N |
| <10 or Fixed Price | 0 | Y |
| Profile Strength (Client Count) | | |
| 0 Clients in the last 12 months | 1 | N |
| ⋮ | | |
| 20+ Clients (not ETG) in the last 12 months | -3 | N |
| Profile Strength (Proposal Count) | | |
| 0 Proposal in the last 12 months | 1 | N |
| ⋮ | | |
| 10+ Proposals in the last 12 months | -2 | N |
| Non-ETG Spend on Platform | | |
| $0-$4,999 Spend on the platform in the last 12 months (non ETG) | 0 | N |
| ⋮ | | |
| $20K+ Spend on the platform in the last 12 months (non ETG) | -3 | N |
| ETG Jobs on Platform | | |
| 0 ETG Jobs in the last 12 months | -1 | N |
| ⋮ | | |
| Only ETG Jobs in the 12 months | 3 | N |
| ETG Spend on Platform | | |
| $0-$9,999 Spend from ETG in the last 12 months | 0 | N |
| ⋮ | | |
| $20K+ Spend from ETG on the platform in the last 12 months | 3 | N |
| Final Compliance Score | | 4 |

| Score Key | Action |
|---|---|
| 0-5 | Classify as IC. Complete W-9 / W-8-BEN on the Platform |
| All 6-7 | Collect Supporting Documents. If documents provided, classify as IC. If not, move to compliance. |
| All 8 and above | Compliance Review Process, borderline goes to committee |

Onboarding Setup
Freelancers and hiring managers will be prompted to complete required tasks once onboarding is configured.

Premium Content Developers

Go to Dashboard →

| ENGAGEMENT INITIATION | COMPLIANCE | AGREEMENTS |
|---|---|---|
| Confirm Engagement Request | Freelancer Classification Evaluation | IC Agreement |
| Training and Q&A | W-9 or W-8BEN Info | Freelancer Services Agreement |
| Provide Photo with White Background | Client Questionnaire | Non-Disclosure Agreement |
| Preview Emails | Freelancer Questionnaire | Code of Conduct Training |
| + Add Task | International ID Validation | + Add Task |
| | Certificate of Insurance | |
| | + Add Task | |

Edit Task

Task Name
Client Questionnaire

Task Description (Optional)
Please describe task engagement...

Add Attachment ⊞

Task Type
Onboarding

Onboarding Level (This controls the rigor of Onboarding for freelancers)

Level 3 ▶

Task Completion Before Beginning Work
⦿ Required - Task must be completed.
○ Optional - Work can start while this onboarding task is being completed.

Smart Task (Optional)
Compliance Client Questionnaire ▶
Administrative Info (Configuration data only viewable by administrators.)

Assign Access Permissions by Roles

Fig. 13

Freelancer Questionnaire

Please tell us more about yourself and your work. We use this information to ensure you are engaged correctly for this project. Click to Print 1. Do you currently work for the company as an independent contractor or employee?

| Yes | No |

1-1. How do you currently work for the company?

| As an Employee |
| As an Independent Contractor |
| Other |

1-2. Will you be doing the same work?

| Yes | No |

1-3. Duration of Current Job

| Start Date | Mar 24, 2014 ☐ | End Date | Aug 24, 2014 ☐ |

2. Do you work for any other company?

Fig. 15A

Client Questionnaire

Please tell us more about your relationship with this freelancer. We use freelancer is engaged correctly for this project. Click to Print 1. Are there employees at your company who perform the same job the freelancer will perform?

| Yes | No |

2. Will the freelancer be filling a role vacated by an employee who left the company?

| Yes | No |

3. Does the freelancer currently work for your company (whether as an independent contractor)?

| Yes | No |

4. Will the freelancer be supervising employees at your company?

| Yes | No |

Fig. 15B

| Starting Score | 100 | Answer | Question |
|---|---|---|---|
| | -2 | >6 months | Longer than 6 months? |
| | -4 | Hourly | Hourly? |
| | -8 | Former EE | 1. Does the Contractor currently work for your company as an independent contractor or employee? |
| | | | 1.1 How does the Contractor currently work for you? |
| | | | 1.1.1. As an employee |
| | | | 1.1.2. As an independent contractor |
| | | | 1.1.3. Other |
| | -4 | Yes | 1.2 Will the Contractor be doing the same work? |
| | | | 1.2.1. Yes |
| | | | 1.2.1. No |
| | | | 1.3 Start date of current job |
| | | | 1.4 End date of current job |
| | -5 | Yes | 2. Does your company have employees that do the same type of work as Contractor? |
| | -4 | Yes | 3. Will the Contractor be replacing an employee who has left the company? |
| | -4 | Yes | 4. Will the Contractor supervise company employees or other contractors? |
| | -6 | Yes | 5. Will the Contractor's work be the primary type of work that your company offers/provides to its clients/customers? |
| | -4 | No | 6. Can the Contractor hire assistants to complete the work? |
| | -3 | Yes | 7. Do you need the Contractor to work a certain number of hours each day? |
| | -3 | Yes | 8. Do you need the Contractor to work specific hours (i.e. from 9-5)? |
| | -5 | Yes | 9. Will you train the Contractor? |
| | | | 9.1. Yes: Please describe the training you will provide. |
| | | | 9.2. No |
| | -4 | Yes | 10. Do you need the Contractor to perform the work in a certain order? |
| | -4 | Yes | 11. Will you provide the Contractor with instructions on how to perform the work, asid |
| | -4 | Yes | 12. Will you supervise the Contractor's day-to-day activities? |
| | -3 | Yes | 13. Does the Contractor need to provide you with regular reports (i.e. daily, weekly)? |
| | -4 | Yes | 14. Will the Contractor work onsite at your company? |
| | -2 | | 15. Will you provide the Contractor with any of the following? |
| | -2 | | 15.1. Computer/Laptop |
| | -2 | | 15.2. Email |

Responses will drive the classification decisions.

Fig. 16

APPARATUS, METHOD AND SYSTEM FOR CLASSIFYING FREELANCERS

RELATED APPLICATIONS

This application claims benefit of priority under 35 U.S.C. § 119(e) of the U.S. Provisional Patent Application Ser. No. 62/018,479, filed Jun. 27, 2014, entitled "PTC Classification Overview," and of the U.S. Provisional Patent Application Ser. No. 62/138,911, filed Mar. 26, 2015, entitled "PTC," which are both hereby incorporated by reference in their entirety.

This application is a Continuation In Part and claims priority under 35 U.S.C. § 120 of the co-pending U.S. patent application Ser. No. 14/628,095, filed Feb. 20, 2015, entitled "Onboarding Dashboard and Methods and System Thereof," which in turn claims benefit of priority under 35 U.S.C. section 119(e) of the U.S. Provisional Patent Application Ser. No. 61/942,558, filed Feb. 20, 2014, entitled "Onboarding Dashboard," all of which are hereby incorporated by reference in their entirety.

FIELD OF INVENTION

The present invention relates to classifications. More particularly, the present invention relates to an apparatus, method and system for classifying freelancers.

BACKGROUND OF THE INVENTION

Onboarding incoming freelancers is an opportunity for a client to engage with the freelancers before the freelancers take on actives roles in the organization. As onboarding is a multifaceted operation, there are inevitable delays, complexities, inconsistencies, inefficiencies and a lack of visibility along the way, particularly in an online marketplace setting where professionals (e.g., freelancers) and buyers of services (e.g., clients) engage in the development and delivery of remote services and where chances are high that the professionals and buyers of services will never get to meet face to face. Onboarding freelancers currently involves many inefficient and manual steps. In addition, there are a lack of guidance and unnecessary delays in understanding of what needs to be completed, in communication and in capturing of completed artifacts, which can be numerous. Yet, proper onboarding is critical in a successful engagement kickoff, ensuring that these professional are aware of what is expected of them.

When working with freelancers, clients are legally required to determine whether their freelancers are "independent contractors" or are "payrolled employees." Correctly making these distinctions is important as there are tax and other legal implications. Traditionally, the process of making a distinction can take weeks, which extends the time to onboard a freelancer.

BRIEF SUMMARY OF THE INVENTION

Embodiments of the present invention are directed to a classification engine that classifies freelancers in one of a plurality of categories. The classification engine captures data to perform a first classification evaluation of each engaged freelancer. The first classification evaluation is used to drive different levels of onboarding to ensure appropriate onboarding tasks are completed for each engaged freelancer before the freelancer starts work for a client. Depending on the level of onboarding, the classification engine either uses the first classification evaluation to make a determination regarding the classification of the freelancer or captures additional data to perform a second classification evaluation to make the determination. The classification engine eliminates delays, manual workarounds and helps scale work with enterprise clients.

In one aspect, a system implementing a classification engine is provided. The system includes a job post associated with a client, a freelancer profile associated with a freelancer, a client profile associated with the client, and a computer server. The computer server is configured to access the job post, the freelancer profile, and the client profile, automatically capture relevant data from the job post, the freelancer profile and the client profile, make a first determination, wherein the first determination influences rigor of onboarding the freelancer, which is reflected in an onboarding dashboard that is generated by the computer server and that is personal to the freelancer, and present the onboarding dashboard to the freelancer.

In some embodiments, the system also includes at least one data store that is configured to store the job post, the freelancer profile and the client profile.

In some embodiments, the onboarding dashboard for the freelancer includes tasks established for the freelancer by the client.

In some embodiments, the computer server is also configured to implement a first algorithm that computes a first score based on the captured data, wherein the first score is mapped to one of a plurality of onboarding levels. In some embodiments, the first determination is based on the first score.

In some embodiments, onboarding associated with each of the plurality of onboarding levels is progressively more rigorous than onboarding associated with a previous onboarding level.

In some embodiments, when the first score is within a first range, the computer server is also configured to ascertain a classification of the freelancer.

In some embodiments, when the first score is within a range different from the first range, the computer server is also configured to obtain responses input by at least one of the freelancer and the client and, according to at least a second determination, classify the freelancer in one of a plurality of categories.

In some embodiments, the computer server is also configured to implement a second algorithm that computes a final score based on the responses. In some embodiments, the second determination is based on the final score.

In some embodiments, the system further includes an entity configured to provide legal review of at least a part of the responses.

In some embodiments, the classification of the freelancer in one of a plurality of categories is also based on the legal review.

In some embodiments, the plurality of categories includes a contractor category and a payrolled employee category.

In another aspect, a non-transitory computer-readable medium is provided. The non-transitory computer-readable medium stores instructions that, when executed by a computing device, cause the computing device to perform a method of implementing a classification engine. The method includes communicatively coupling with at least one data store to access a job post, a freelancer profile and a client profile stored therein, automatically capturing relevant data from the job post, the freelancer profile and the client profile, according to a first score derived from the captured data, influencing rigor of onboarding the freelancer, which is reflected in an onboarding dashboard that is generated by the computer server and that is personal to the freelancer and presenting the onboarding dashboard to the freelancer.

In some embodiments, when the first score is below a first threshold, the method further comprising classifying the freelancer in a first of two categories.

In some embodiments, when the first score is above a second threshold, the method further comprising obtaining freelancer responses that are input by the freelancer, obtaining client responses that are input by the client, computing a second score derived from the freelancer responses and the client responses, and classifying the freelancer in one of the two categories based on the second score.

In some embodiments, the classification of the freelancer in one of the two categories is also based on legal review of at least one part of the freelancer responses and the client responses. In some embodiments, the legal review is manually performed by an entity.

In some embodiments, the method also includes allowing the client to create the job post regarding a job and to create the client profile and allowing the freelancer to create the freelancer profile.

In some embodiments, the method also includes allowing the client to configure onboarding tasks such that each of the onboarding tasks either will or will not become a part of the freelancer's onboarding dashboard depending on the first score.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 12 illustrates an exemplary list of factors and associated factor values relating to the first classification evaluation in accordance with some embodiments.

FIG. 13 illustrates a graphical representation of task configuration interface in accordance with some embodiments.

FIG. 15A illustrates an exemplary freelancer questionnaire form in accordance with some embodiments.

FIG. 15B illustrates an exemplary client questionnaire form in accordance with some embodiments.

FIG. 16 illustrates an exemplary list of factors and associated factor values relating to the second classification evaluation in accordance with some embodiments.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Onboarding

An exemplary freelancer life cycle includes a recruitment stage, an onboarding stage, a mid-engagement stage and an offboarding stage. Onboarding is a key stage of the freelancer life cycle as new freelancers are oriented to their specific job functions and associated work expectations. A well established onboarding process will successfully integrate new hires into the workforce.

An onboarding dashboard can be used to transition candidates into welcomed and engaged freelancers. In an online services exchange medium, clients find and hire freelancer candidates "on demand" to get projects done quickly and cost effectively. A client is able to use the onboarding dashboard to configure onboarding tasks for each individual or group of candidates the client hires. The candidates, once engaged with the client, are able use the onboarding dashboard to view the onboarding tasks established for them by the client. The onboarding dashboard provides complete visibility of the onboarding progress to both the client and the candidates, enforcement of step dependencies and management of documents.

Figure 1:
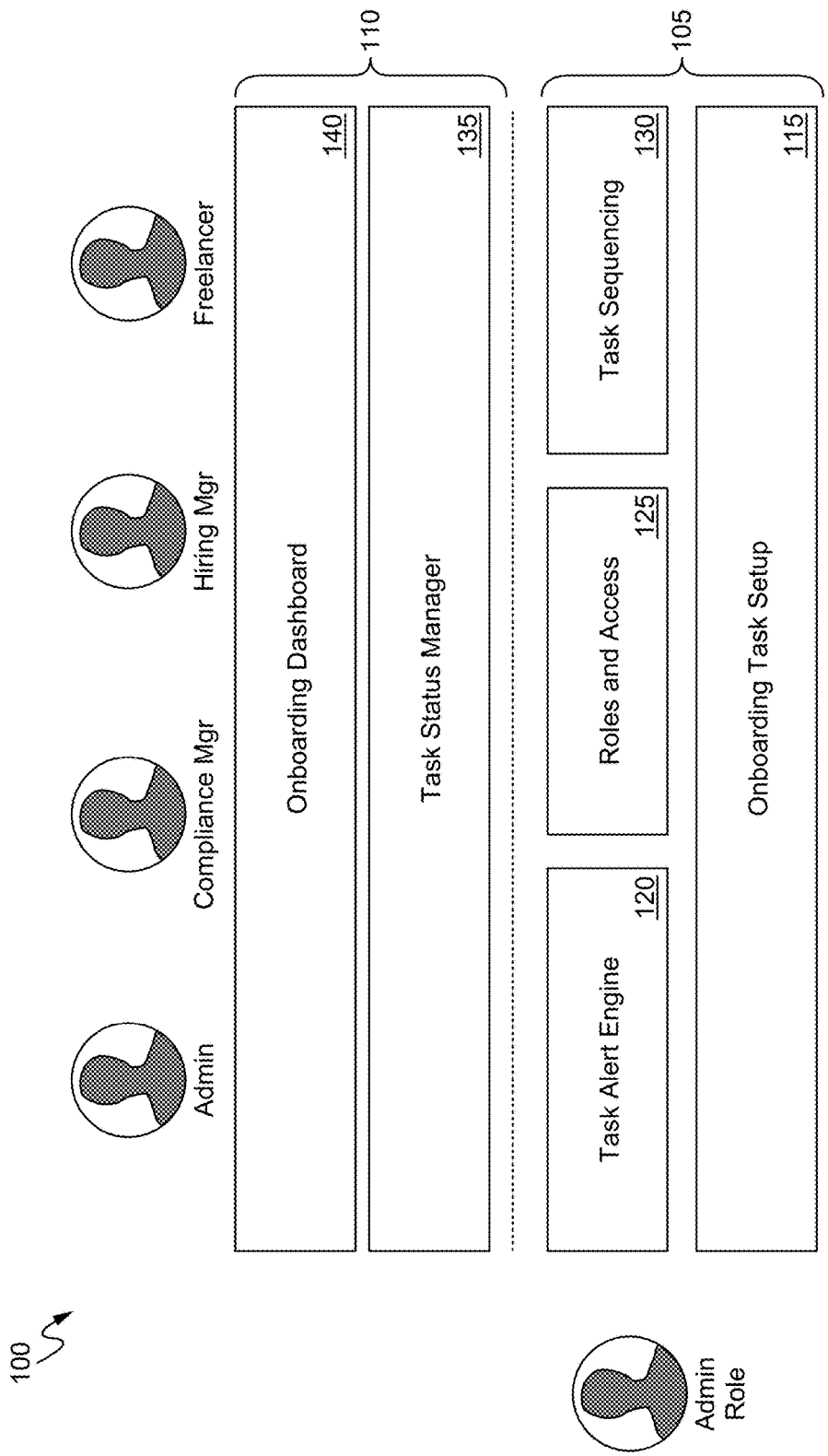
FIG. 1 illustrates a diagram of components of an onboarding dashboard engine in accordance with some embodiments.

FIG. 1 illustrates a diagram of components of an onboarding dashboard framework 100 in accordance with some embodiments. From a high level perspective, the components include back-end system components 105 and front-end system components 110. The back-end system components 105 include an onboarding task setup component 115, with a task alert engine 120, a roles and access component 125 and a task sequencing component 130 coupled with the onboarding task setup component 115 and/or to each other. The front-end system components 110 include a task status manager 135 coupled with an onboarding dashboard 140. The onboarding dashboard 140 includes at least two views: one view is a client view and another view is a freelancer view. The onboarding dashboard 140 can include other views, such as a administrator view. Each component is in communication with one, some or all of the other components of the onboarding dashboard framework 100. In some embodiments, the onboarding dashboard framework 100 includes one or more user interfaces to one or more of the components of the onboarding dashboard framework 100. The user interfaces are rendered in a web browser or, alternatively, the user interfaces are rendered in a standalone application that is in communication with the services exchange medium.

In some embodiments, an administrator can access both the back-end system components 105 and the front-end system components 110. In some embodiments, a compliance manager, a hiring manager and a freelancer can access only the front-end system components 110. The compliance manager and the hiring manager are collectively referred to as a customer or client. The customer is typically a buyer of services within the services exchange medium. In some embodiments, the customer is an enterprise scale organization that hires freelancers through the services exchange medium. Alternatively, the customer is an individual person that hires freelancers through the services exchange medium. It should be noted that the terms "customer," "client," "buyer of services" and simply "buyer" are used interchangeably herein. It should also be noted that the terms "freelancer," "service provider" and simply "provider" are used interchangeably herein. In some embodiments, the administrator can be a third party administrator who is hired by the client or by the freelancer or, alternatively, can be the client.

Within the services exchange medium, a freelancer is able to create an online profile and search through job posts, and a client is able to create and post jobs and search for freelancers. The services exchange medium provides an online platform with tools to facilitate matching clients with freelancers, to facilitate communication between clients and freelancers and to facilitate the completion of deliverables. An exemplary services exchange medium is discussed in the co-pending U.S. patent application Ser. No. 11/450,875, entitled "Virtual Office Environment," filed on Jun. 12, 2006, which is hereby incorporated by reference in its entirety. In some embodiments, a customer is able to hire a plurality of freelancers for a job in the services exchange medium. In some embodiments, a freelancer is able to work for more than one customer in the services exchange medium. In some embodiments, the services exchange medium provides clients and freelancers who are engaged with the clients with access to the onboarding dashboard. The aspects of each of the components of the onboarding dashboard framework 100 in FIG. 1 will become apparent as the configuration and accessing of the onboarding dashboard are further described below.

Additional details and aspects of a services exchange medium are described in the co-pending U.S. patent application Ser. No. 14/520,226, entitled "A Machine Learning Based System and Method of Calculating a Match Score and Mapping the Match Score to a Level," filed on Oct. 21, 2014, which is hereby incorporated by reference in its entirety. The aspects of the service exchange medium described in U.S. patent application Ser. No. 14/520,226 may be used to implement some or portions thereof of the various components shown in the figures. For example, Apache Tomcat and JAR RabbitMQ may be used to listen and pass events between the various components shown in FIGS. 11 and 12 (such as, e.g., user inputs triggering actions that make calls to remote procedures that pass events to the RabbitMQ) and an ODS and/or JAR may be used to store historical data about the performance and completion of tasks.

Figure 2:
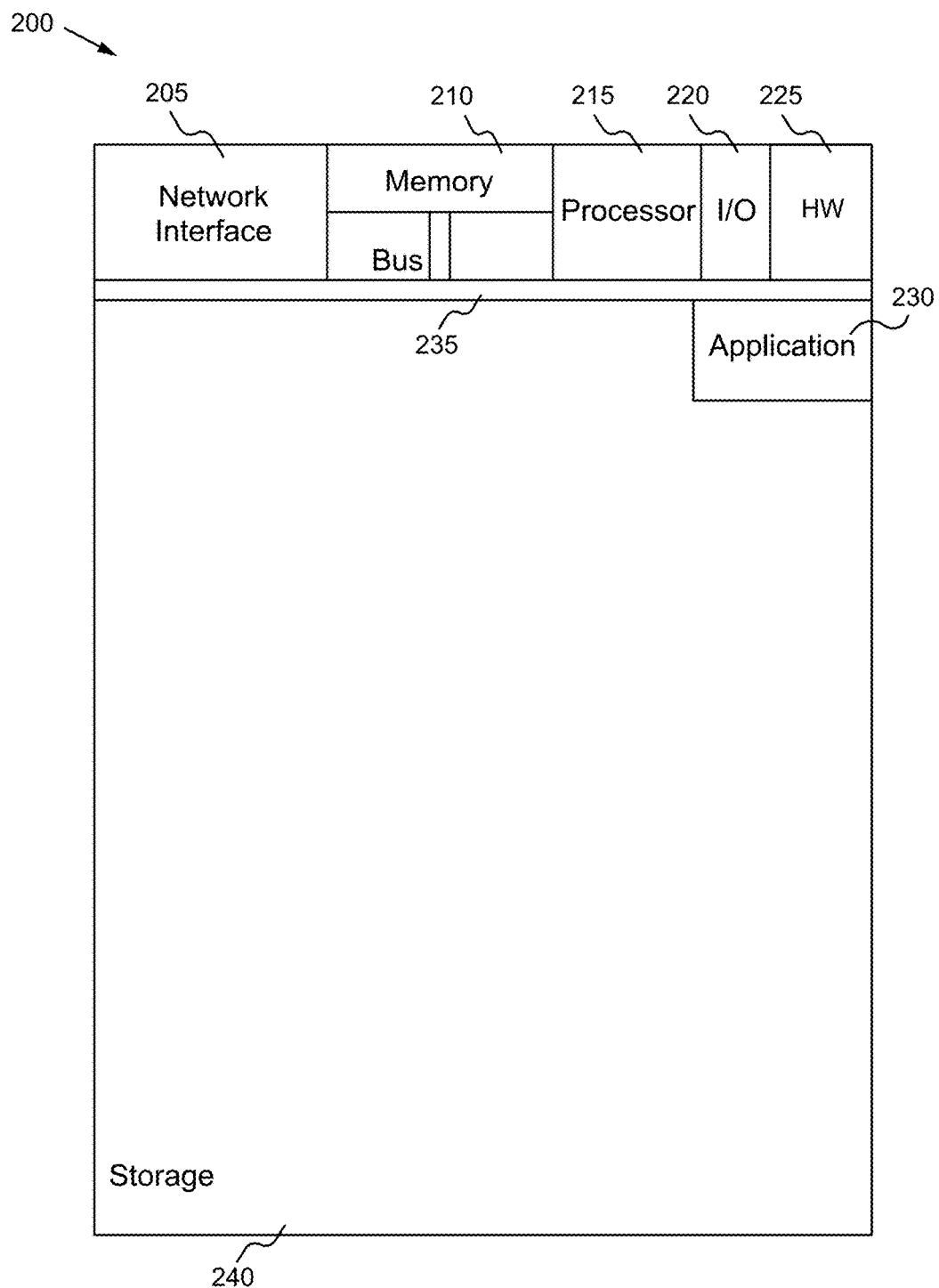
FIG. 2 illustrates a graphical representation of an exemplary computing device in accordance with some embodiments.

FIG. 2 illustrates a graphical representation of an exemplary computing device 200 in accordance with some embodiments. The computing device 200 is able to serve, compute, communicate, generate and/or display information. In some embodiments, the onboarding dashboard framework is implemented one or more of the computing device 200.

In general, a hardware structure suitable for implementing the computing device 200 includes a network interface 205, a memory 210, processor 215, I/O device(s) 220, a bus 235 and a storage device 240. The choice of processor is not critical as long as the processor 215 has sufficient speed. The memory 210 is any conventional computer memory known in the art. The storage device 240 is a hard drive, CDROM, CDRW, DVD, DVDRW, flash memory card or any other storage device. The computing device is able to include one or more network interfaces 205. An example of a network interface includes a network card connected to an Ethernet or other type of LAN. The I/O device(s) 220 are able to include one or more of the following: keyboard, mouse, monitor, display, printer, modem and other devices. Software applications 230 are likely to be stored in the storage device 240 and memory 210 and are executed by the processor 215. Software applications 230 include an application configured to implement the onboarding dashboard framework. More or less components shown in FIG. 2 are able to be included in the computing device 200. In some embodiments, hardware 225 for implementing the onboarding dashboard framework is included. Although the computing device 200 in FIG. 2 includes applications 230 and hardware 225 for implementing the onboarding dashboard framework, the onboarding dashboard framework can be implemented on a computing device in hardware, firmware, software or any combination thereof.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

Figure 3A:
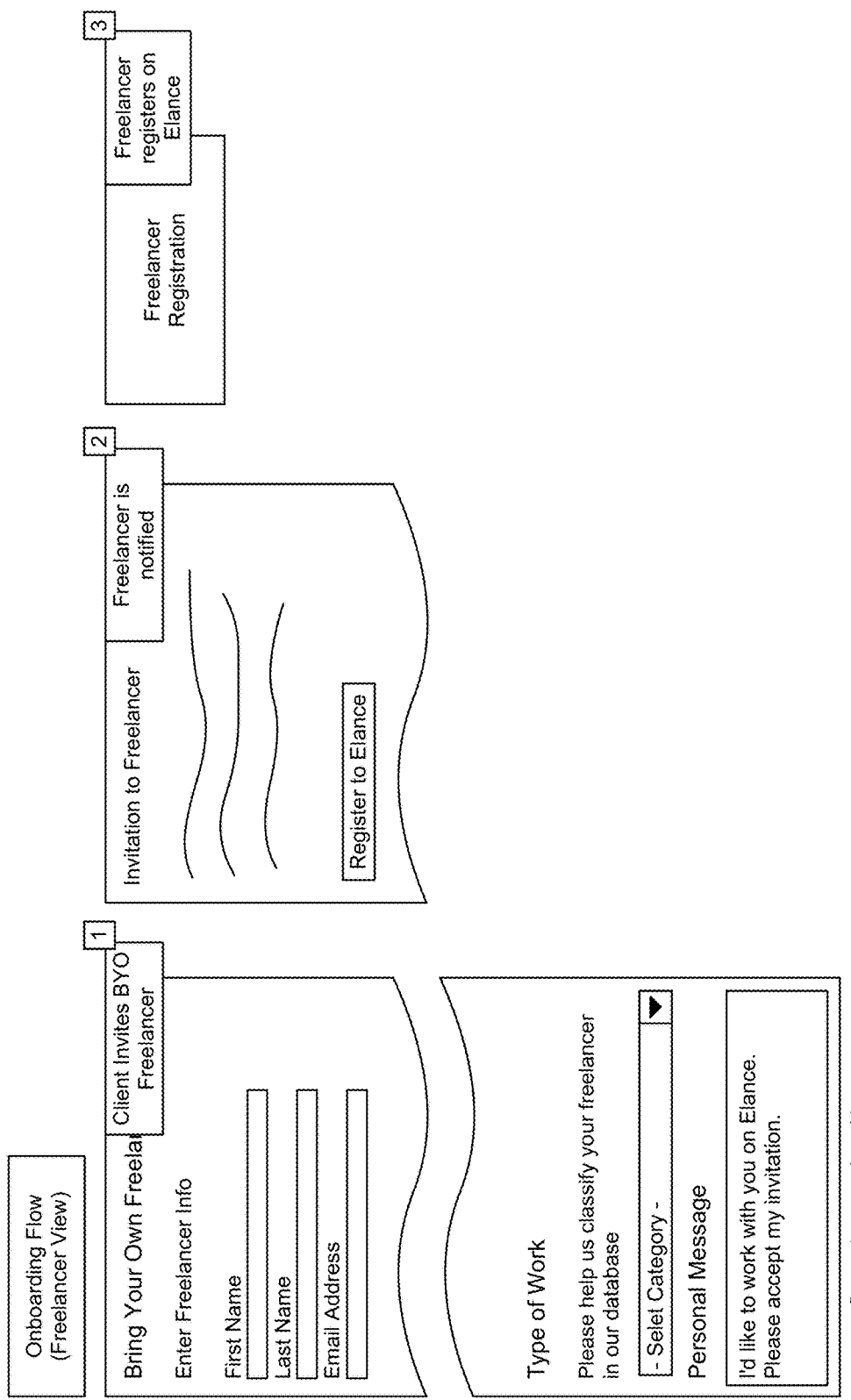
FIGS. 3A-3C illustrate a graphical flow of an onboarding process from a freelancer perspective in accordance with some embodiments.
Figure 3B:
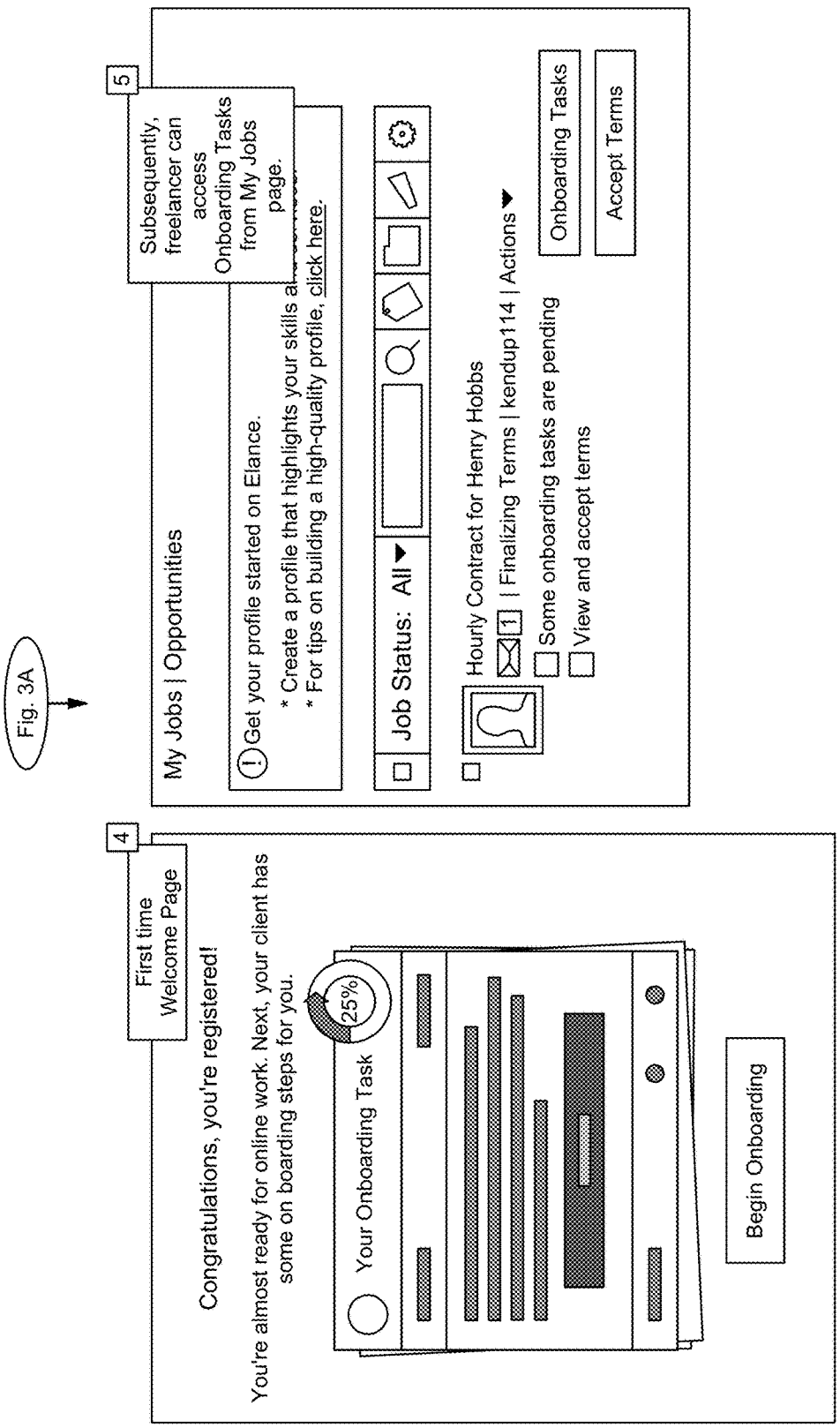
Figure 3C:
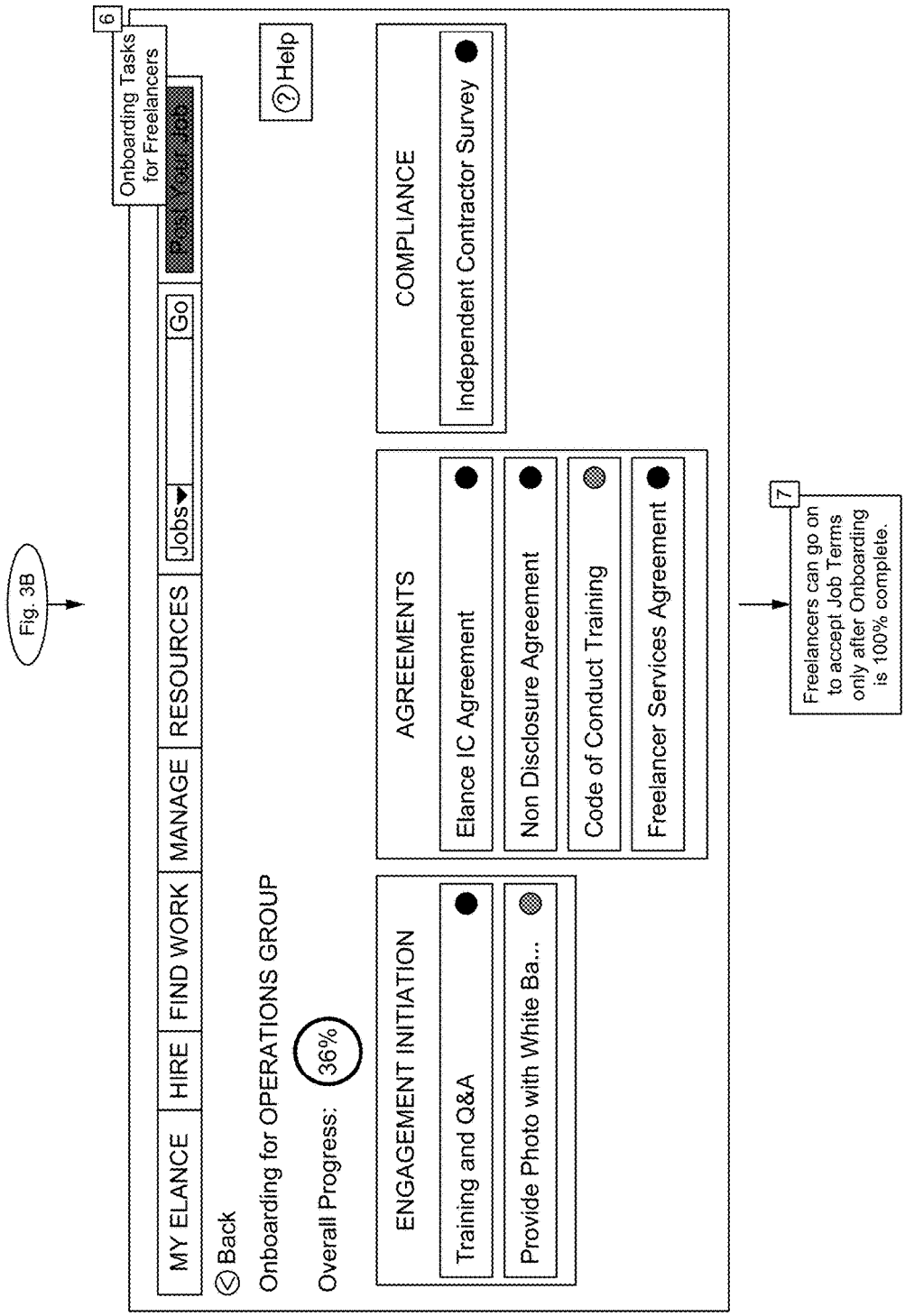

FIGS. 3A-3C illustrate a graphical flow 300 of an onboarding process from a freelancer perspective in accordance with some embodiments. The graphical flow 300 includes an exemplary screenshot at each step of the onboarding process. The graphical flow 300 begins on FIG. 3A and continues on FIGS. 3B-3C. Assume a client has found a potential freelancer candidate to hire for a job. At Step 1, the client invites the freelancer to join the services exchange medium. The client is already a member of the services exchange medium but the freelancer is not yet a member of the services exchange medium. In some embodiments, the invitation indicates which group the freelancer will be associated with. Groups are discussed in detail elsewhere. At Step 2, the freelancer is notified of the invitation via, such as email, text message or another suitable medium. At Step 3, the freelancer registers as a member of the services exchange medium by accessing, for example, a registration user interface to become a member of the services exchange medium. Upon registration with the services exchange medium, at Step 4, the freelancer is presented with a welcome user interface, which informs the freelancer that the freelancer has to complete onboarding steps that are required by the client. In some embodiments, if the freelancer is already a member of the services exchange medium, the Steps 1-4 are skipped (e.g., not performed). At Step 5, the freelancer is presented with a jobs user interface, which provides a link to create an online profile if one is not yet created, and a list of all jobs that the freelancer is associated with in the services exchange medium. The online profile can be viewed by all members of the services exchange medium. An exemplary online profile is discussed in the co-pending U.S. patent application Ser. No. 12/474,127, entitled "Online Professional Services Storefront," filed on May 28, 2009, which is hereby incorporated by reference in its entirety. Each job in the list includes a link to a personal and customized onboarding dashboard for a group the freelancer is associated with for the job, and a link to accept job terms. In FIG. 3B, only one job is shown for the freelancer in the screenshot for the Step 5. The onboarding tasks are typically configured by the client for the group and are reflected in the onboarding dashboard. Specifics of the client configuring the onboarding tasks are further discussed in FIG. 6. At Step 6, the freelancer is presented with the onboarding dashboard either from the jobs user interface upon activating the onboarding dashboard link or from the welcome interface upon activating the begin onboarding link. Specifics of the freelancer's view of the onboarding dashboard are further discussed in FIGS. 4A and 4B. At Step 7, the freelancer is able to accept the job terms (e.g., from the jobs user interface) only after at least a portion of the onboarding tasks is completed. In some embodiments, only those onboarding tasks that are required by the client need to be completed before the freelancer is able to accept the job terms.

Figure 4A:
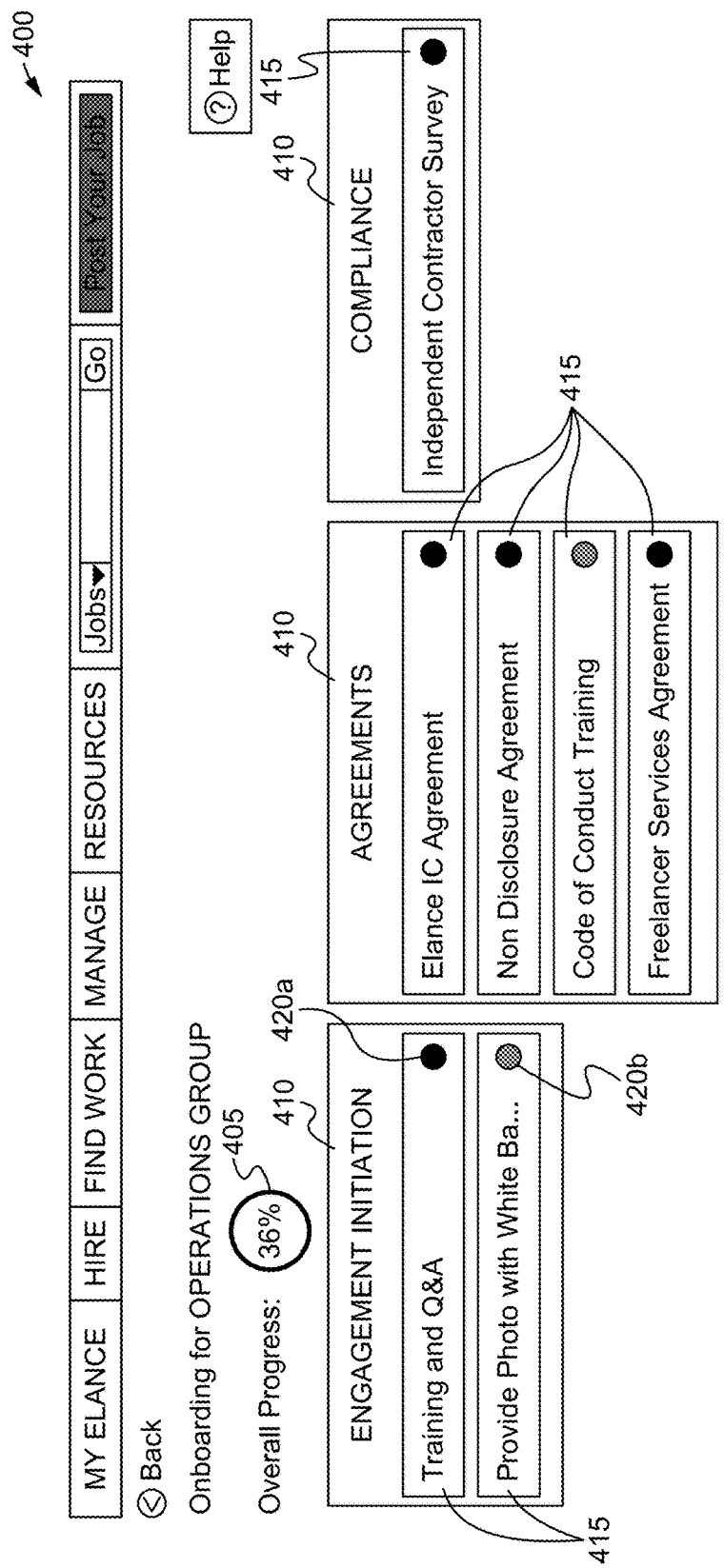
FIGS. 4A-4B illustrate an exemplary client view of an onboarding dashboard in accordance with some embodiments.
Figure 4B:
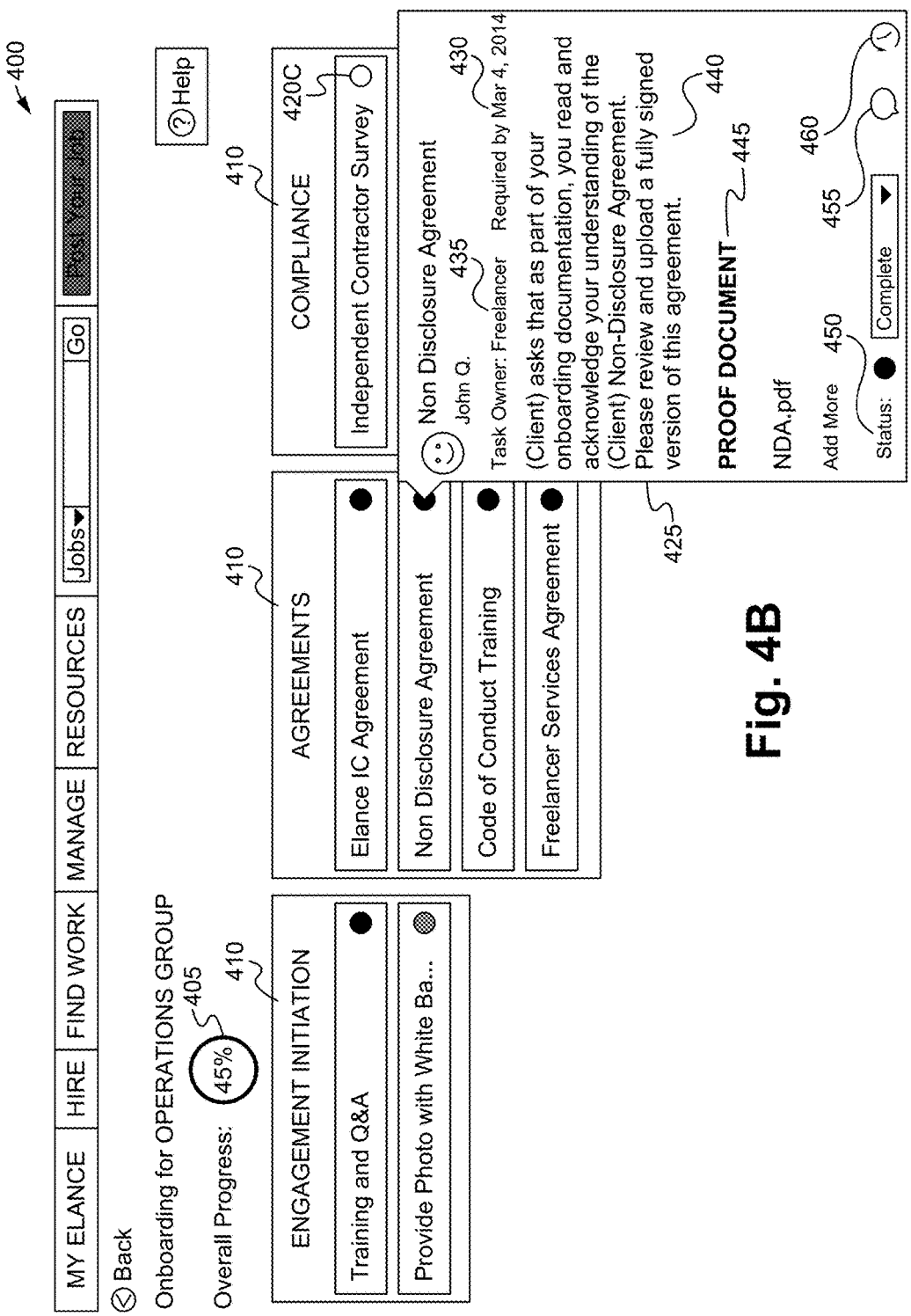

FIGS. 4A-4B illustrate an exemplary client view of an onboarding dashboard 400 in accordance with some embodiments. In FIGS. 4A-4B, the onboarding dashboard 400 is associated with the "Operations Group." The onboarding dashboard 400 will typically include an indicator 405 of the overall progress of the onboarding process. The onboarding tasks configured by the client are typically grouped into different onboarding sections and are reflected as such in the onboarding dashboard 400. Again, the specifics of the client configuring the onboarding tasks are discussed in FIG. 6.

In FIG. 4A, the onboarding sections 410 include an Engagement Initiation section, an Agreements section, and a Compliance section. However, other sections, such as a Pre-Screening section and a Documentation section, are possible and are shown in the onboarding dashboard 400 if the client has configured these other sections. The Engagement Initiation section includes a Training and Q&A task and a Provide Photo task. The Agreements section includes an Elance IC Agreement task, a Non-Disclosure Agreement task, a Code of Conduct Training task, and a Freelancer Services Agreement task. The Compliance section includes an Independent Contractor Survey task.

As explained elsewhere, each task is assigned an owner and can either be optional or required. An optional task does not need to be completed by the task owner, while a required task must be completed by the task owner. A task can be dependent on another task being completed. For example, the Code of Conduct Training task cannot be started unless the Elance IC Agreement task, the Non-Disclosure Agreement task and the Freelancer Services Agreement task are completed. In some embodiments, task dependencies can occur across multiple onboarding sections in addition to within a single onboarding section. For example, the Elance IC Agreement task cannot be started before the Training and Q&A task is completed. The tasks listed in each section may or may not be ordered in the sequence of requirements. In some embodiments, if a subsequent task is dependent on other task(s) that are not yet completed, then the freelancer is prevented from starting this subsequent task (e.g., downloading/uploading documents, viewing a video, etc., associated with the subsequent task) until the other task(s) are completed. In some embodiments, upon activation of the subsequent task, a popup window message is generated to inform the freelancer which other task(s) need to be completed prior to starting the subsequent task.

In some embodiments, tasks that have been completed, tasks that have not yet been started, tasks that have been started but not yet completed and flagged tasks are distinguished from each other in the onboarding dashboard 400. For example, completed tasks are shown in dark full circles 420*a* (FIG. 4A), tasks that have not yet been started are shown in light full circles 420*b* (FIG. 4A), and tasks that have been started but not yet completed are shown in dark ring 420*c* (FIG. 4B). For another example, flagged tasks are shown in different colors from those tasks that are not flagged. A task that is flagged requires attention by either the client, the freelancer or both. Other distinguishing marks in the onboarding dashboard 400 are possible. It should be noted that the onboarding dashboard is extensible and can include more or less statuses.

Referring to FIG. 4B, the freelancer is able to activate a task to view details of that task and/or to start that task. For example, upon activation of the Non-Disclosure Agreement task such as via a mouse-over or the like, a popup window 425 appears. In some embodiments, the popup window 425 includes whether the task is either optional or required 430. In some embodiment, a deadline to complete the task is also provided. In some embodiments, the popup window 425 includes a countdown timer 460 to the deadline. In some embodiments, the popup window 425 includes who is responsible for completion of the task 435, which can either the freelancer or the client (e.g., administrator, compliance manager, hiring manager, etc.). In some embodiments, the popup window 425 includes a description of that task 440 and an ability to download and/or upload file(s) 445. The description can include text, a multimedia video, a hyperlink to a destination, and/or other suitable content. In some embodiments, if the owner of the task is the client, then the description of that task 440 is not shown since the freelancer is not privy to such details as it is private information to the client. In some embodiments, the popup window 425 allows the task owner to update/change the status of the task 450 (e.g., completed, started but not yet completed, flagged, not yet started). In some embodiments, the status cannot be updated to "completed" unless at least one document is provided with the task or a required video is viewed, etc. In some embodiments, the popup window 425 includes a communication feature 455 that allows the client and the freelancer to communicate regarding the task. In some embodiments, all communication is through the services exchange medium. A history of events that pertains to the activity, which includes at least a communication thread and file upload/download activities, is stored in a data store and displayed in the popup window 425 each time the activity is activated from the onboarding dashboard 400. The history of events advantageously provides full visibility regarding the progress and/or completion of the task. In some embodiments, the freelancer is able to view any of the files associated with the activity from the popup window 425.

Figure 5A:
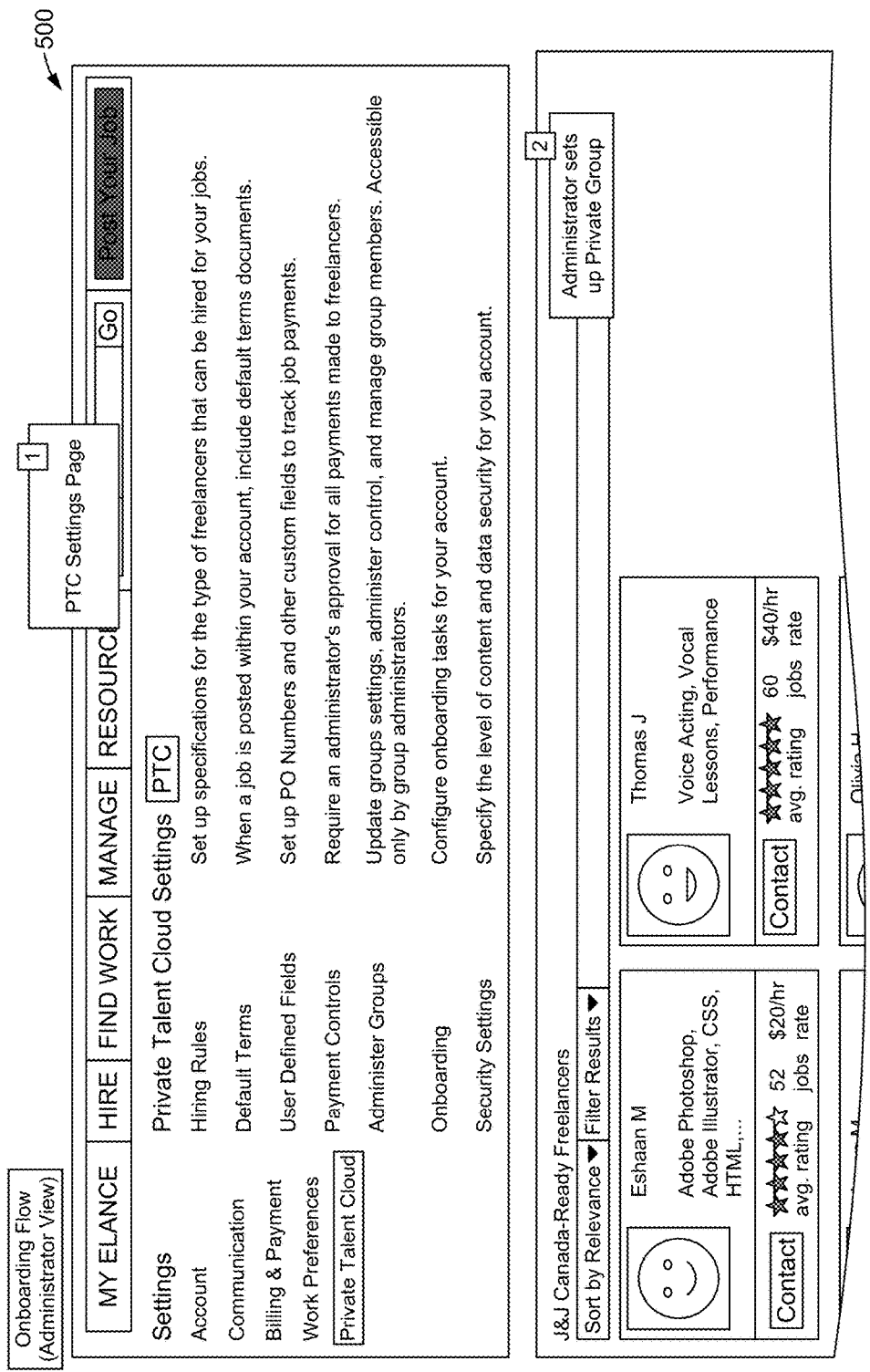
FIGS. 5A-5C illustrate a graphical flow of an onboarding process from a client perspective in accordance with some embodiments.
Figure 5B:
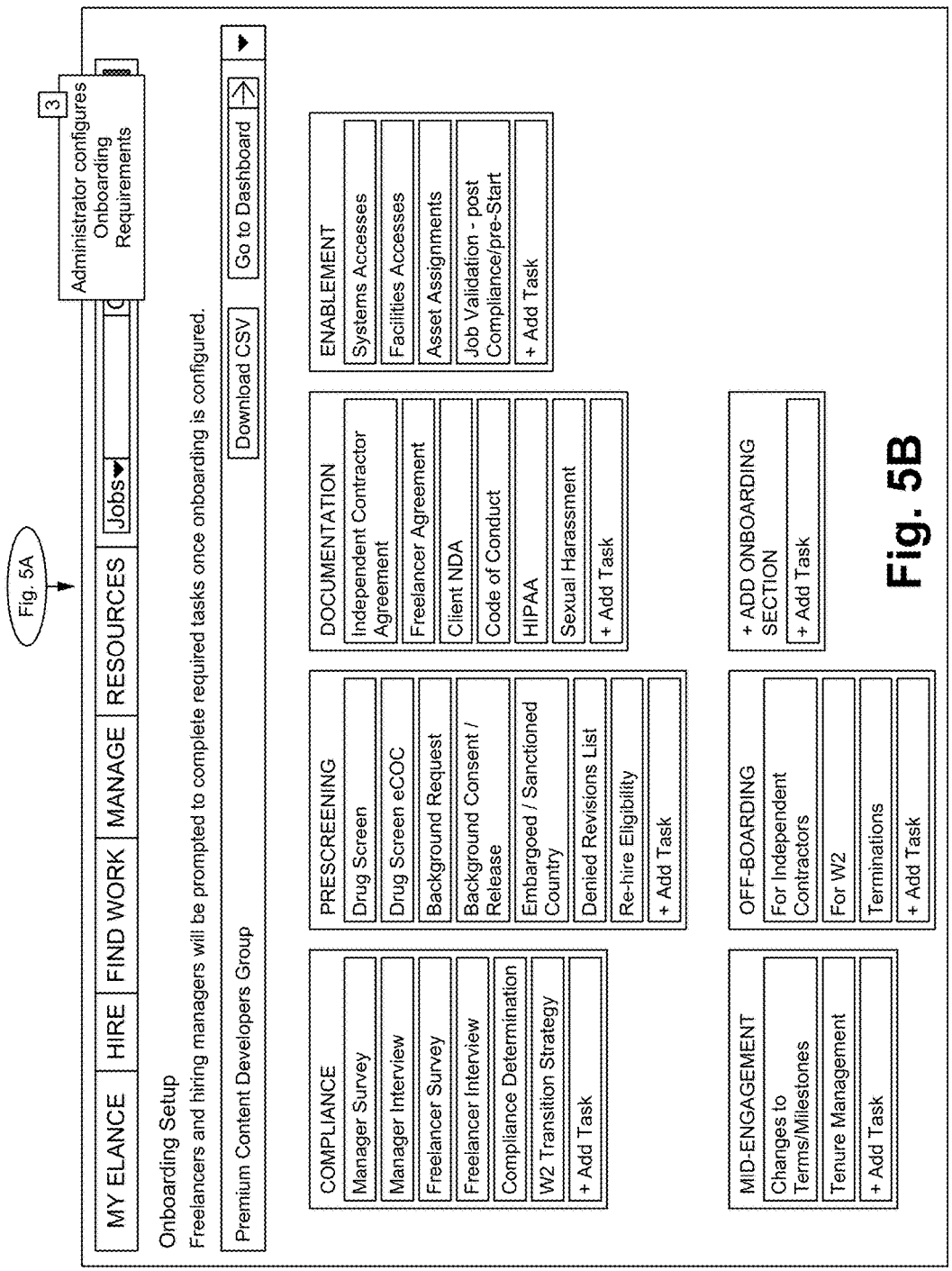
Figure 5C:
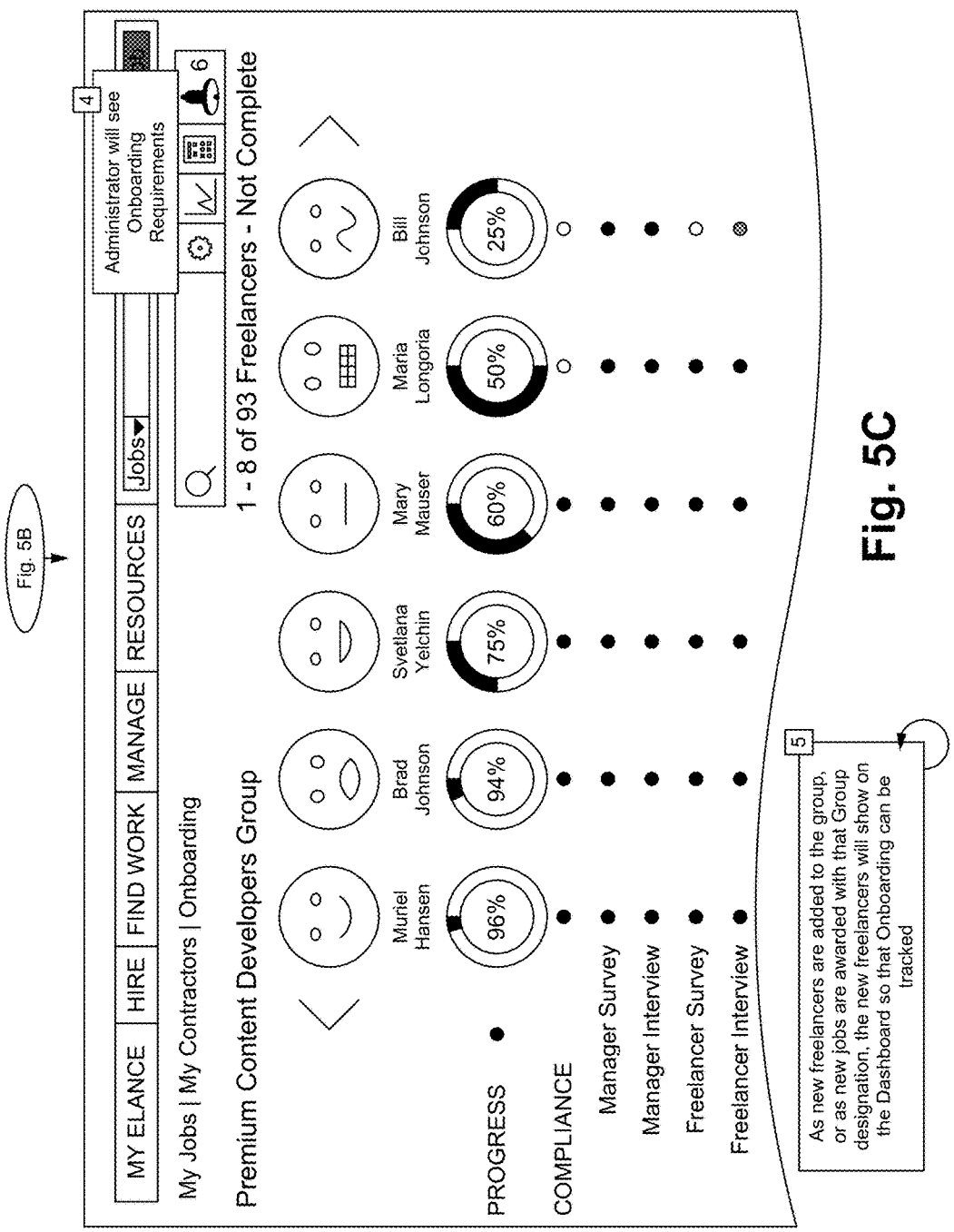
Figure 6:
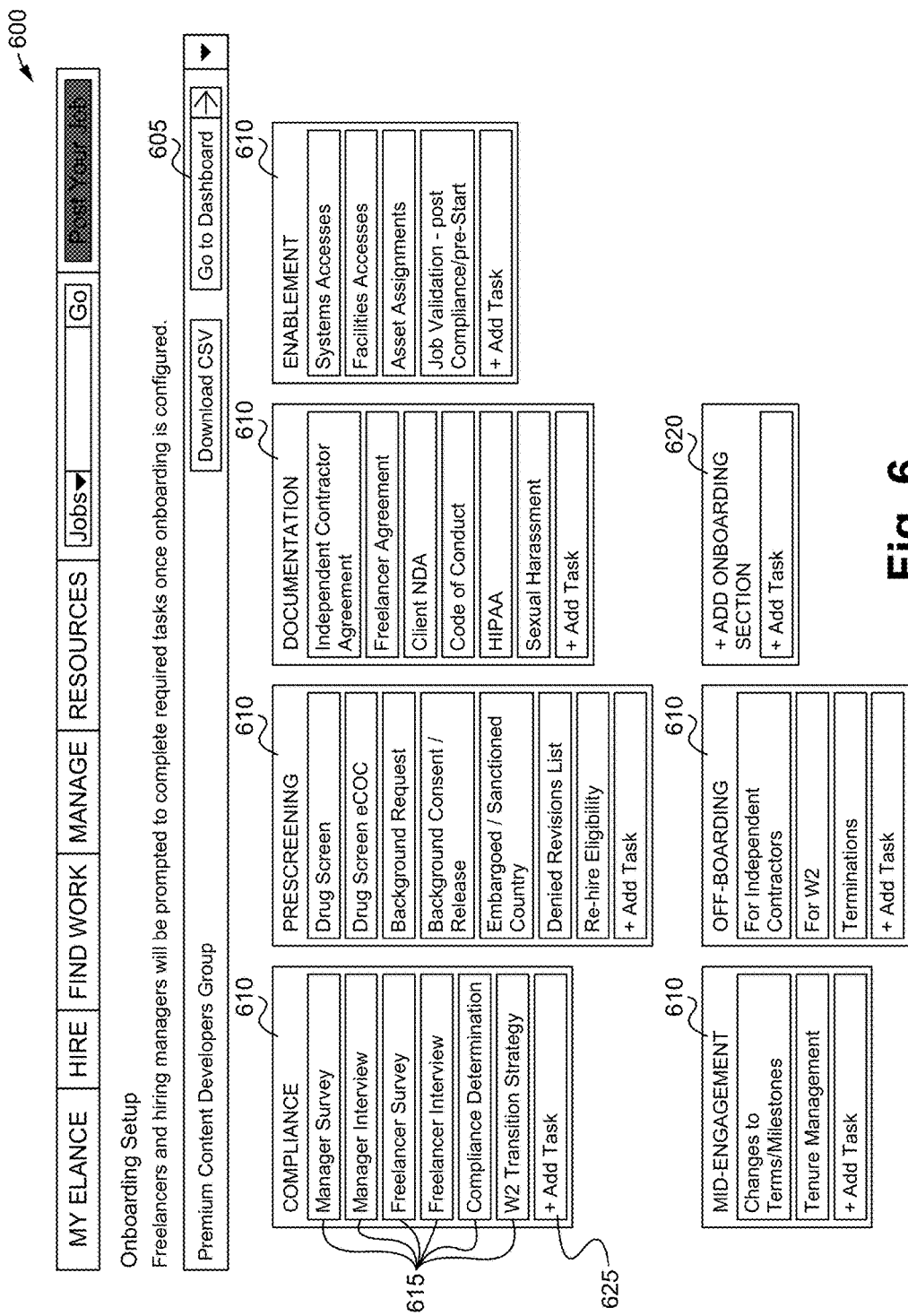
FIG. 6 illustrates a graphical representation of onboarding setup interface in accordance with some embodiments.
Figure 7:
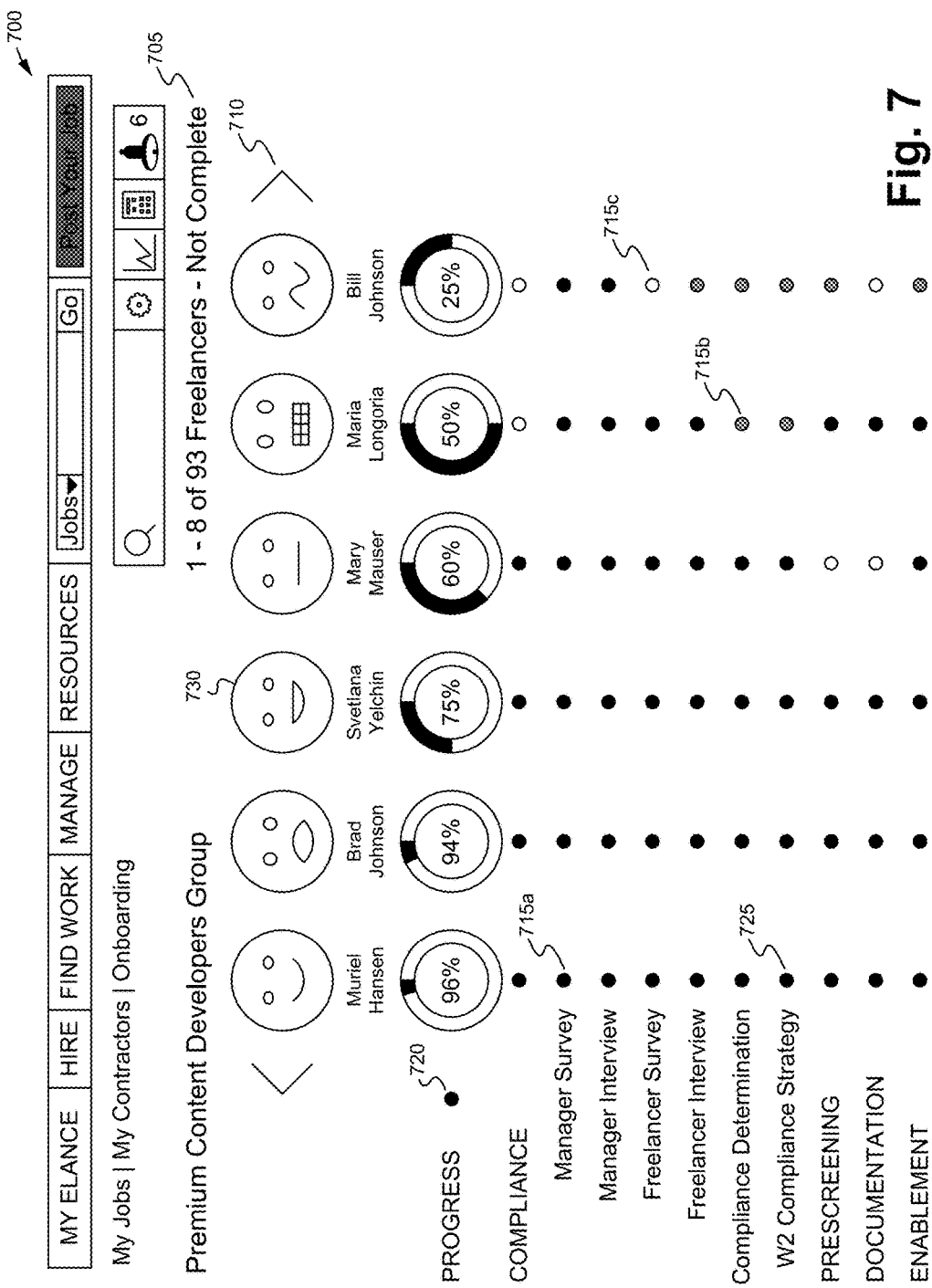
FIG. 7 illustrates an exemplary client view of an onboarding dashboard in accordance with some embodiments.

FIGS. 5A-5C illustrate a graphical flow 500 of an onboarding process from a client perspective in accordance with some embodiments. The graphical flow 500 includes an exemplary screenshot at each step of the onboarding process. The graphical flow 500 begins on FIG. 5A and continues on FIGS. 5B-5C. At Step 1, the client is able to activate certain links, including an Administer Groups link and an Onboarding link, from a settings user interface. Activation of the Administer Groups link allows the client to set up different groups in the services exchange medium, such as the "Operations Group" (FIGS. 4A-4B) and the "Premium Content Developers Group" (FIGS. 6-7). Activation of the Onboarding link allows the client to configure onboarding tasks for each of the groups the client has set up. At Step 2, the client (e.g., administrator) sets up different groups in the client's organization. The client is able to assign each freelancer that the client engages with to one of the groups, such as when the client invites them to join the services exchange medium. At Step 3, the client configures onboarding tasks for each group. Briefly, configurations for a task include indicating whether the task is required or optional, who the task owner (e.g., freelancer, administrator, compliance manager or hiring manager, etc.), and whether the task is dependent on another task (e.g., completed in sequence, after completion of the another task) or is independent from other tasks (e.g., completed in parallel with the other tasks). Specifics of the client configuring the onboarding tasks are further discussed in FIG. 6. At Step 4, the client is able to see progress of the onboarding process for each freelancer that the client is engaged with. Specifics of the client's view of the onboarding dashboard are further discussed in FIG. 7. The onboarding dashboard typically pertains to one of the groups that the client has previously set up at the Step 2. At Step 5, as new freelancers are added to the group or as new jobs are awarded with that group designation, the new freelancers will be reflected on the onboarding dashboard so that onboarding can be tracked.

FIG. 6 illustrates a graphical representation of onboarding setup interface 600 in accordance with some embodiments. In FIG. 6, the onboarding setup interface 600 is associated with the "Premium Content Developers Group." The onboarding setup interface 600 includes a link for the client to view the onboarding dashboard, which is illustrated in FIG. 7. In FIG. 6, six onboarding sections 610 are already created for the group: a Compliance section, a Pre-Screening section, a Documentation section, an Enablement section, a Mid-Engagement section, and an Offboarding section. Each section typically includes at least one task 615. For example, the Compliance section includes six tasks: a Manager Survey task, a Manager Interview task, a Freelancer Survey task, a Freelancer Interview survey task, a Compliance Determination task and a W2 Transition Strategy task. The client is able to add more tasks 615 to each section 610 via an add feature 625 associated with that section 610. In some embodiments, the client is able to remove a task by activating that task, which will take the client to a task configuration interface to configure the task. This task configuration interface allows the client to edit specifics of the task and to remove the task from the section. Other ways to remove a task are contemplated. Alternatively, the client is not able to remove a task once the task is added. The client is also able to add additional sections via an add feature 620. When a new section is added, the client is able to add tasks to that new section via the associated add feature. In some embodiments, if a section does not include at least one task, then that section is not reflected in corresponding onboarding dashboards for the client and the freelancer.

The task configuration interface for each task allows the client to include a description of the task, which can be text-based, multimedia-based and/or another suitable format. The client is also able to indicate whether the task is optional or required, and who the responsible party is for the completion of the task (e.g., task owner). In some embodiments, alerts regarding the task are sent to at least the task owner. The client is also able to indicate whether file attachments are required to close the task (e.g., indicated as completed). The client is also able to set up permissions regarding who can view the task and who can update the status of the task. The client is also able include internal notes regarding the task that are not made available to the freelancer. The client is also able to add tags to the task for reporting purposes. The client is also able to add task dependencies, which indicate which other task(s) need to be completed before this task can be started. The client is also able to include alerts and tracking of whether the deadline to complete the task has passed. The client is also able to set reoccurring reminders at different time intervals (e.g., monthly, yearly, etc.) if the task, such as a drug test, needs to be repeated in the future. The client is also able to set future tasks to be completed along with proper alerts to the responsible party(ies). Other configurations are contemplated. After the client is finished configuring the task, the information is saved and retrievable for later modifications.

It should be noted that each group can have different onboarding tasks. For example, freelancers in the logo design group do not need a background check, while freelancers who work with confidential information do need a background check. Typically, the client indicates which group the freelancer that the client is engaging with belongs to, such as during the invitation to join the services exchange medium (FIG. 3, Step 1). In some embodiments, the configurations for one group can be used as a basis for configuring another group that the client additionally creates such that the client need not repeat the same configurations for multiple groups, thereby saving time and resources.

Referring again to FIG. 6, the onboarding setup interface 600 allows the client to rearrange the sections 610 and to rearrange the tasks 615 within each section 610 and across sections 610 via, for example, drag and drop actions. For example, the Enablement section can be moved to after the Pre-screening section and before the Documentation section by a drag and drop action. Rearrangements can be done for presentation purposes. Once the client is done with the onboarding setup for the group, the client is able to view the onboarding dashboard to see the onboarding progress of each freelancer associated with the group.

FIG. 7 illustrates an exemplary client view of an onboarding dashboard 700 in accordance with some embodiments. Continuing with the above example, the onboarding dashboard 700 shows freelancers in the "Premium Content Developers Group." FIG. 7 shows those freelancers associated with this group who have not yet completed the onboarding process. However, the client is able to toggle between this view, a view of all those who have completed the onboarding process, and a view of all of the freelancers associated with this group via a toggle element 705. The onboarding dashboard 700 displays up to eight freelancers at a time, although that number is only exemplary and do not limit the invention in any way. The client is able to scroll between different pages of freelancers via a scroll feature 710. Progress of the onboarding process for each freelancer is shown beneath an area for their image 730. In some embodiments, the freelancers are ordered by their progress. However, other orderings or sorts are contemplated.

The onboarding dashboard 700 organizes the freelancers, their overall progress and the status of each task in a table. In FIG. 7, the tasks are shown in the first column, and each of the freelancers is shown in a subsequent column. The tasks are organized by sections. When a section is activated, the table expands to list the associated tasks for that section. In FIG. 7, the tasks associated with the Compliance section are listed, but the tasks for the Pre-Screening section, the Documentation section and the Enablement section are not listed.

In some embodiments, tasks that have been completed, tasks that have not yet been started, tasks flagged and tasks that have been started but not yet completed are distinguished from each other. For example, completed tasks are shown in dark full circles 715a, tasks that have not yet been started are shown in light full circles 715b, and tasks that have been started but not yet completed are shown in dark ring 715c. For another example, flagged tasks are shown in a different color (e.g., red) than those tasks that are not flagged (e.g., green). In some embodiments, if the deadline to complete a task has passed, then the status is automatically designated in yellow or some other differentiating color. Although other distinguishing marks in the onboarding dashboard 700 are possible, in one embodiment, the distinguishing marks in the onboarding dashboard 700 are consistent with the distinguishing marks in the onboarding dashboard 400. It should be noted that the onboarding dashboard is extensible and can include more or less statuses. An aspect of the present invention is to allow the client to track freelancers in different statuses.

The onboarding dashboard 700 allows the client to filter the view based on a selected status of a particular section or a particular task via a progress detail feature 720. In some embodiments, upon activation of the progress detail feature 720, a filter is associated with each task or section that allows the client to filter freelancers for that task or section based on the selected status. For example, using the filter for the Compliance section, the client is able to choose to see those freelancers who have completed the Compliance section, to see those freelancers who have started but not yet completed the Compliance section, to see those freelancers who have one or more flagged tasks associated with the Compliance section, to see those freelancers who have not yet started the Compliance section, or to see those freelancers who have missed a deadline for at least one task associated with the Compliance section. The progress detail feature 720 allows the client to narrow down and track freelancers being delayed in the onboarding process so that the client is able to work with these freelancers to get the onboarding tasks completed.

In some embodiments, the client is able to access information of a freelancer by activating the freelancer's image 730 from the onboarding dashboard 700. The information includes a link to the freelancer's online profile and a description of the job that the freelancer is associated with. The information can also include a link to a communications infrastructure within the services exchange medium that allows the client to communicate with the freelancer in realtime via the services exchange medium. Exemplary realtime communications include Internet phone calls and instant chat/messaging.

In some embodiments, the client is able is able to activate a task to view details of that task from the onboarding dashboard 700. For example, upon activation of the W2 Compliance Strategy task 725 under freelancer Muriel Hansen, such as via a mouse-over or the like, a popup window (not illustrated) appears. In some embodiments, the popup window is similar to the popup window 425 of FIG. 4B. In some embodiments, a history of events that pertains to the activity, which includes at least a communication thread and file upload/download activities, is displayed in the popup window each time the activity is activated from the onboarding dashboard 700. The history of events provides full visibility regarding the progress and/or completion of the task. In some embodiments, the client is able to view any of the files associated with the activity from the popup window.

Figure 8:
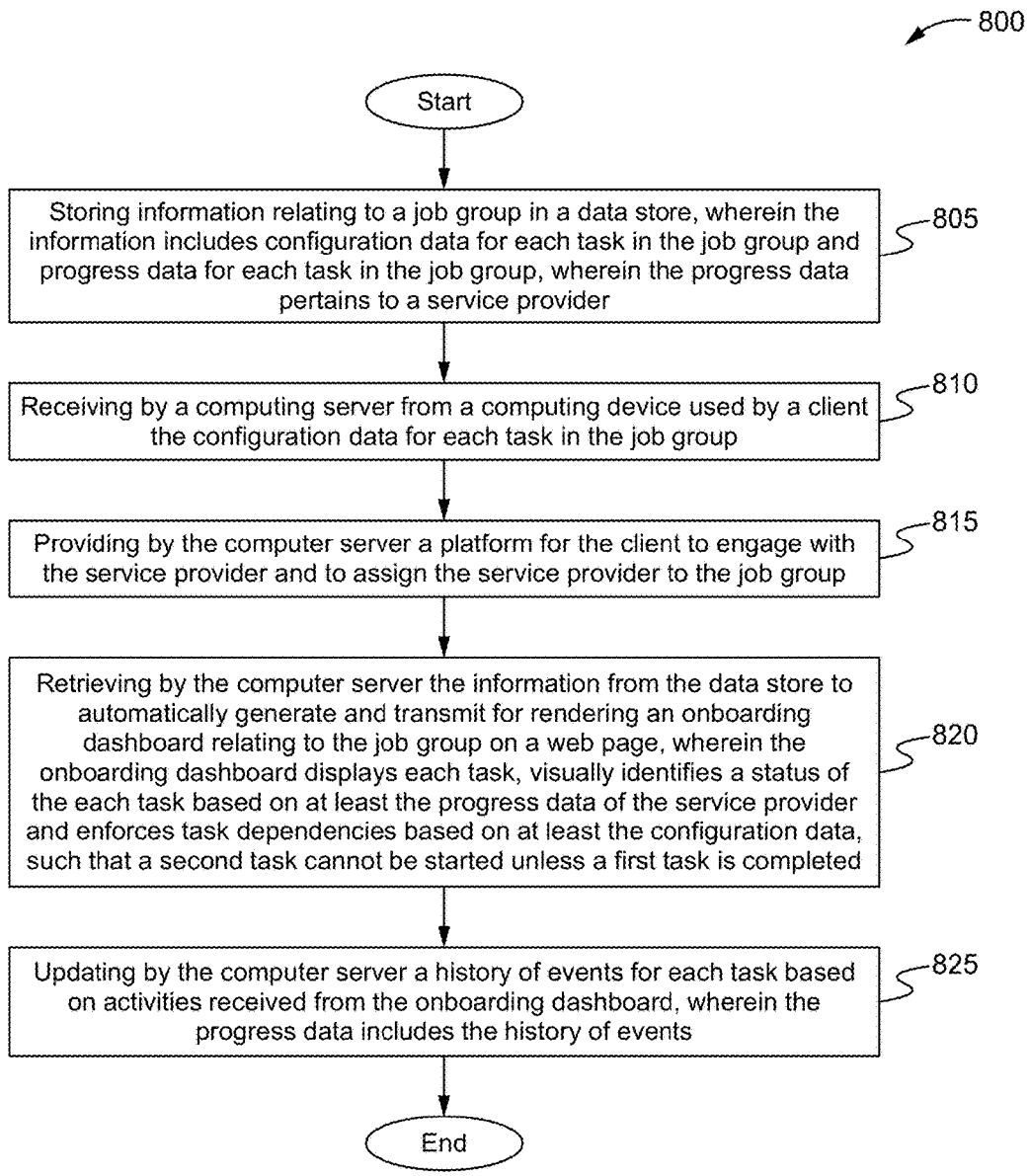
FIG. 8 illustrates an exemplary method of implementing an onboarding dashboard in accordance with some embodiments.

In some embodiments, the onboarding dashboard is implemented by a system that includes a data store and a computer server at a services exchange medium. The computer server is typically communicatively coupled with the data store. FIG. 8 illustrates an exemplary method 800 of implementing an onboarding dashboard in accordance with some embodiments. At Step 805, information relating to a job group is stored in the data store. The information typically includes configuration data for each task in the job group and progress data for each task in the job group. In some embodiments, the configuration data for the each task indicates an owner of the each task. For example, the owner can be the client or the service provider. In some embodiments, the configuration data for the each task also indicates that the completion of the each task is required or is optional. In some embodiments, the configuration data for the each task also indicates that the each task is dependent on another task or is independent of other tasks. In some embodiments, the configuration data also includes a schedule of future tasks to be completed and/or a schedule of reoccurring tasks to be completed, wherein the schedules are configured by the client. The progress data typically pertains to a service provider.

At Step 810, the computing server receives from a computing device used by a client the configuration data for each task in the job group.

At Step 815, the computer server provides a platform for the client to engage with the service provider and to assign the service provider to the job group. In some embodiments, the platform is a web-based platform that includes a search feature and a hire feature to search for and hire the service provider.

At Step 820, the computer server retrieves the information from the data store to automatically generate and transmit for rendering the onboarding dashboard relating to the job group on a web page. The onboarding dashboard typically displays each task, visually identifies a status of the each task based on at least the progress data of the service provider and enforces task dependencies based on at least the configuration data such that a second task cannot be started unless a first task is completed. The status of the each task can be either completed, started but not yet completed, not yet started, flagged or past due. In some embodiments, the configuration data for the each task indicates that a specified user activity, such as uploading a document, viewing a video, or the like, must be performed in order for the status to be changed.

At Step 825, the computer server updates a history of events for each task based on activities received from the onboarding dashboard. The progress data typically includes the history of events.

In some embodiments, the computer server is programmed to receive a signal activating one of the tasks displayed in the onboarding dashboard. In some embodiments, the computer server is programmed to, in response to the signal, automatically generate and transmit a window displaying the history of events pertaining to the activated task. In some embodiments, the computer server is programmed to, in response to the signal, prevent the start of the activated task when one or more tasks that the activated task depends on are not yet completed.

Figure 9:
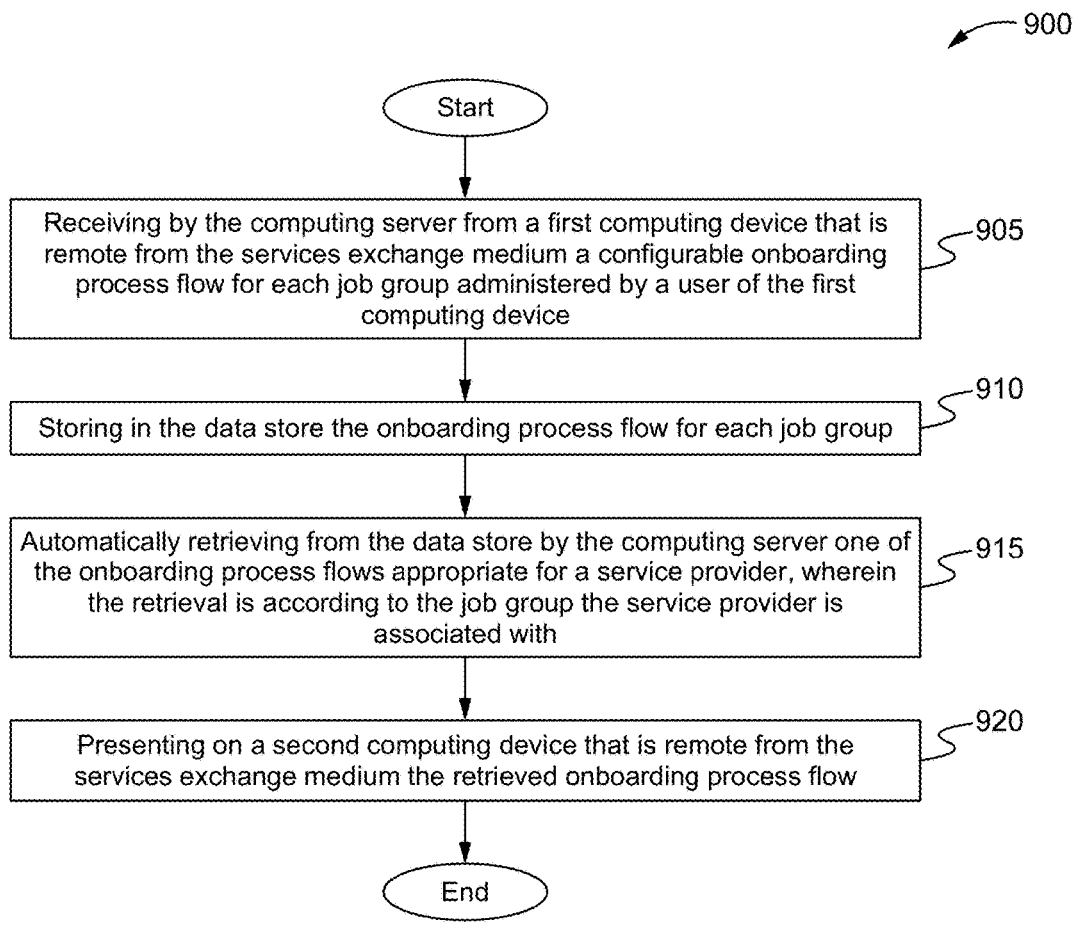
FIG. 9 illustrates another exemplary method of implementing an onboarding dashboard in accordance with some embodiments.

FIG. 9 illustrates another exemplary method 900 of implementing an onboarding dashboard in accordance with some embodiments. At Step 905, the computing server receives from a first computing device that is remote from the services exchange medium a configurable onboarding process flow for each job group administered by a user of the first computing device.

At Step 910, the onboarding process flow for each job group is stored in the data store.

At Step 915, the computing server automatically retrieves from the data store one of the onboarding process flows appropriate for a service provider. The retrieval is typically according to the job group the service provider is associated with. In some embodiments, the retrieved onboarding process includes steps and rules. In some embodiments, one of the rules indicates that one of the steps can be completed in parallel with other steps in the retrieved onboarding process flow. In some embodiments, one of the rules indicates that one of the steps can only be started after other steps in the retrieved onboarding process flow are completed. In some embodiments, the rules enforce step dependencies.

At Step 920, the retrieved onboarding process flow is presented on a second computing device that is remote from the services exchange medium. In some embodiments, the second computing device is used by the service provider. In some embodiments, the retrieved onboarding process flow is rendered in the onboarding dashboard. In some embodiments, the onboarding dashboard visually identifies a status of each step and is a single access point for retrieving all contents associated with the retrieved onboarding process. The contents can include all file histories for all the tasks associated with the retrieved onboarding process.

In some embodiments, onboarding processes can be more rigorous or less. In some embodiments, once a freelancer is offered a job by a client, the services exchange medium reviews data about the job (e.g., duration, work arrangement, etc.), the client and/or the freelancer (e.g., location, how actively they have been engaged with other clients, etc.), and performs a freelancer classification evaluation based on the data. Depending on the outcome of the evaluation, the freelancer will be asked to perform a more or less rigorous onboarding process. In particular, in some embodiments, the onboarding dashboard framework allows the client to configure different levels of a single task when the client is configuring the onboarding tasks, such as via the task configuration interface. The freelancer is asked to perform/complete the suitable level of the task according to the outcome of the evaluation.

As discussed above, the prior art onboarding process is error prone because it is manual and involves lots of paper, which can result in the loss of documentation and in the delay of handoffs. It can therefore be a challenge and frustrating to manage and oversee the prior art onboarding process. As discussed herein, unlike the prior art onboarding process, embodiments of the onboarding dashboard of the present invention provides instant kickoff to the onboarding process, provides clear steps, control, visibility and pinpoints delays in the onboarding process, and streamlines the collection of documents. The onboarding dashboard provides a pleasant experience yet a faster way through the onboarding process as compared to the traditional manual onboarding process. The automation of the onboarding process advantageously cuts down risks, delays and confusion for both the client and candidates, allowing the candidates to transition into welcomed and engaged service providers as they work for clients.

As shown in FIG. 6, the onboarding dashboard 600 also provides for not only the onboarding stage, but also the mid-engagement stage and the offboarding stage. Offboarding is as important as onboarding in a life cycle of a freelancer. The offboarding process helps to prepare a service provider for departure by assisting with the completion of important tasks, such as performing exit interviews, finalizing paperwork and returning of company property. Accordingly, the adherence process from the beginning to the end of the freelancer life cycle is advantageously tracked with full visibility and control over the process.

Classification

Embodiments of the present invention are directed to a classification engine that classifies freelancers in one of a plurality of categories. The classification engine captures data to perform a first classification evaluation of each engaged freelancer. The first classification evaluation is used to drive different levels of onboarding to ensure appropriate onboarding tasks are completed for each engaged freelancer before the freelancer starts work for a client. Depending on the level of onboarding, the classification engine either uses the first classification evaluation to make a determination regarding the classification of the freelancer or captures additional data to perform a second classification evaluation to make the determination. The classification engine eliminates delays, manual workarounds and helps scale work with enterprise clients.

In some embodiments, the classification engine is an component of a freelancer management system, which includes the above-described onboarding dashboard. An enterprise client is able to activate or turn on the classification engine to advantageously automate data capture and classification evaluations. In some embodiments, the client is able to activate the classification engine from the settings user interface described in FIG. 5A.

Figure 10:
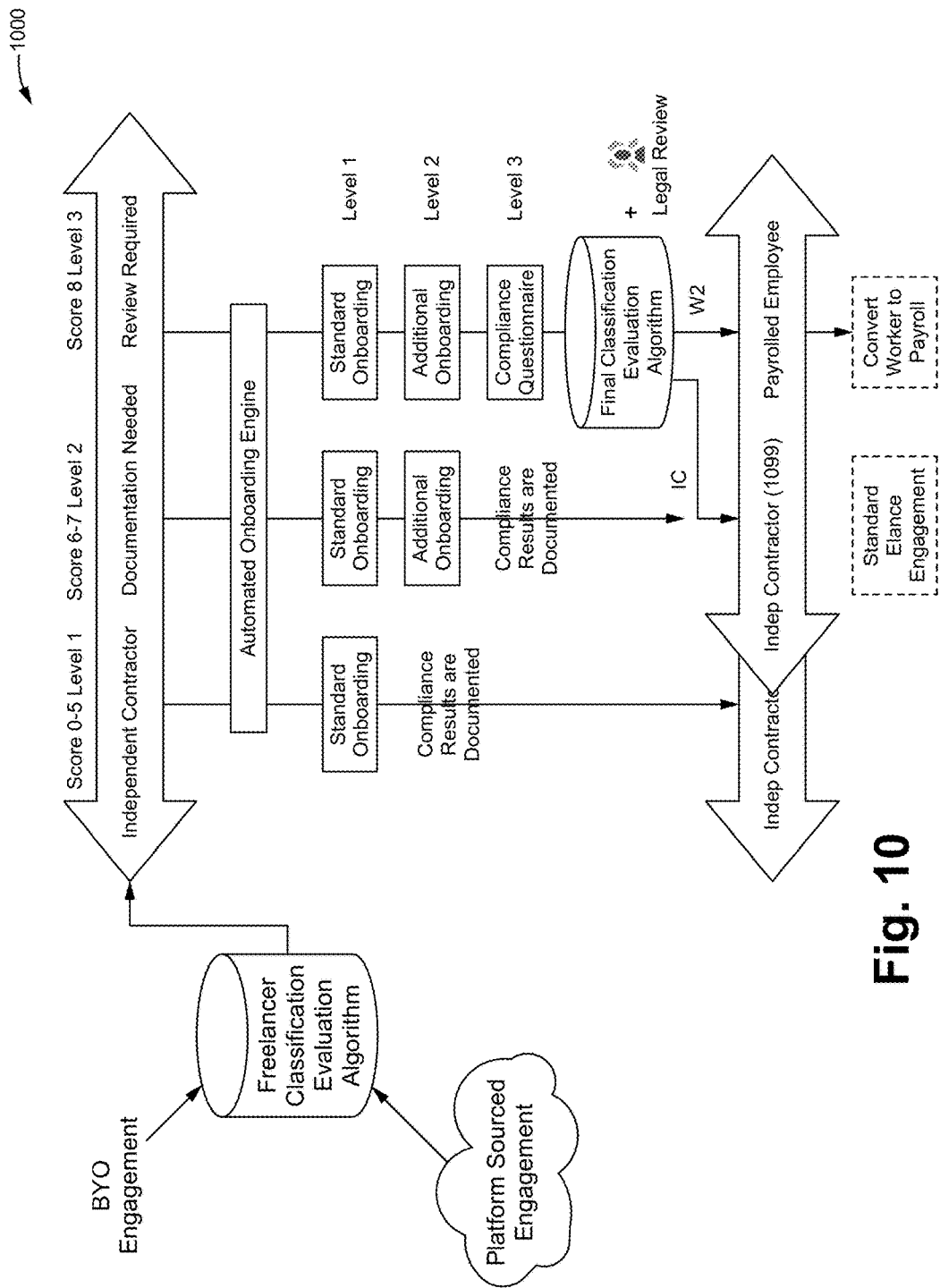
FIG. 10 illustrates an exemplary classification flow diagram in accordance with some embodiments.

FIG. 10 illustrates an exemplary classification flow diagram 1000 in accordance with some embodiments. The classification flow diagram 100 shows different levels of onboarding. While the general classification flow diagram 1000 is continuously referenced, different aspects of the classification flow diagram 1000 will now be discussed, with a first classification evaluation aspect of the classification flow diagram 1100 being discussed first.

Figure 11:
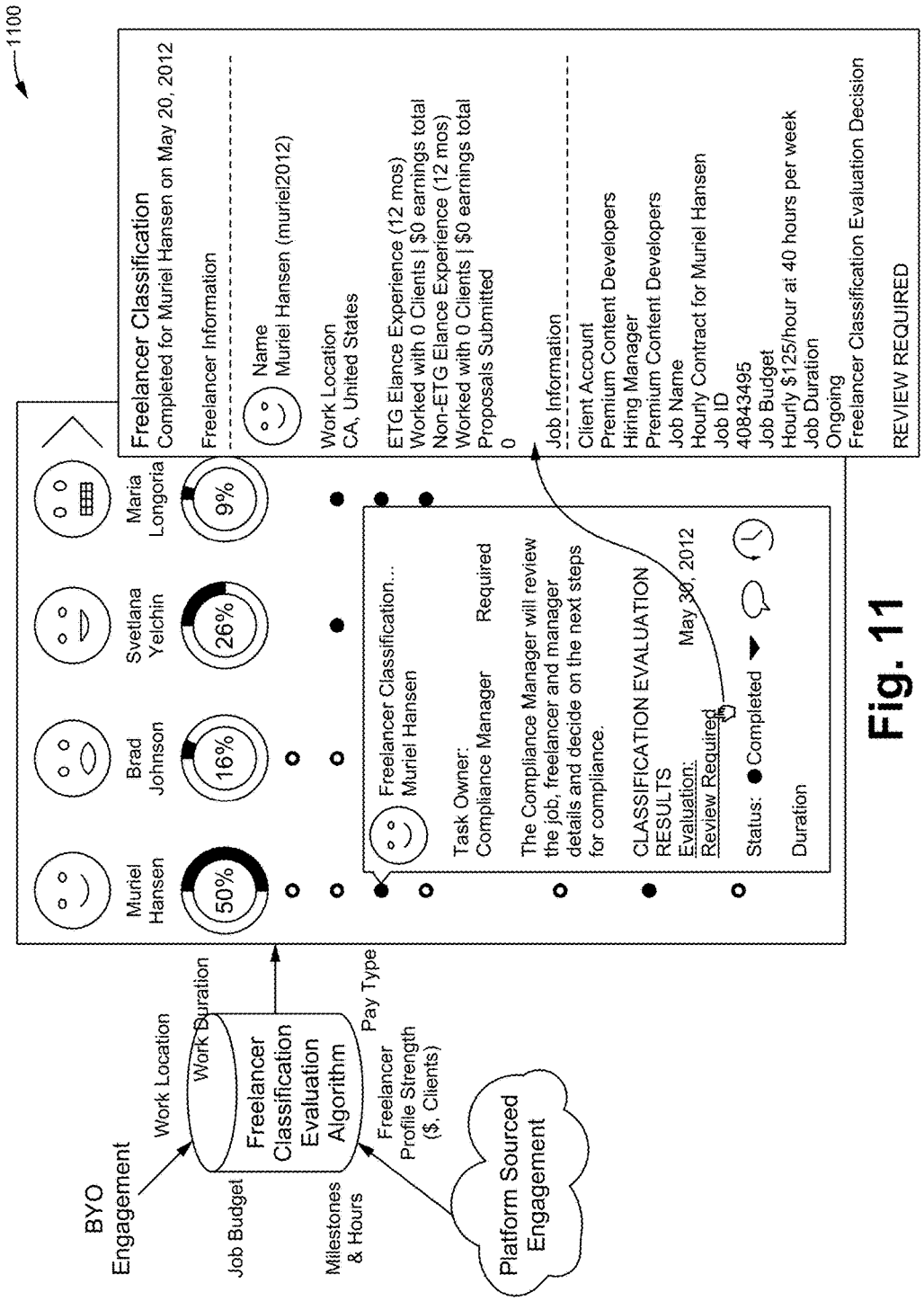
FIG. 11 illustrates an exemplary diagram of a first classification evaluation aspect of the classification flow diagram 1000 of FIG. 10 in accordance with some embodiments.

FIG. 11 illustrates an exemplary diagram 1100 of the first classification evaluation aspect of the classification flow diagram 1000 of FIG. 10 in accordance with some embodiments. The classification engine performs the first classification evaluation of an engaged freelancer, which can be brought on by the client via a BYO (bring your own) engagement or a platform-sourced engagement. An exemplary platform is the services exchange medium discussed in the co-pending U.S. patent application Ser. No. 11/450,875, entitled "Virtual Office Environment," filed on Jun. 12, 2006, which is hereby incorporated by reference in its entirety.

In some embodiments, the first classification evaluation implements an algorithm that is based on job data (e.g., job post), freelancer data (e.g., freelancer profile, historical information of the freelancer that is determined by the services exchange medium) and client data (e.g., client profile, historical information of the client that is determined by the services exchange medium) to determine a score for the freelancer. The score of the freelancer influences the rigor of onboarding the freelancer. For example, when the score in a first range that is associated with a first onboarding level, the classification of the freelancer as an independent contractor can be ascertained by the classification engine.

However, when the score is in a second range or in a third range that is associated with a second or third onboarding level, respectively, the classification of the freelancer as an independent contractor cannot be ascertained by the classification engine. As such, onboarding associated with each of the second onboarding level and the third onboarding level is more rigorous than that associated with the first range, with each onboarding level being progressively more rigorous than the previous onboarding level, such that the classification engine is able to obtain additional information to thereby be able to classify the freelancer in one of the plurality of categories (e.g., independent contractor, payrolled employee). An exemplary payrolled employee is a W2 employee. Although three onboarding levels are discussed herein, more or less levels are contemplated.

In some embodiments, result of the first classification evaluation of the freelancer can be viewed from the client's onboarding dashboard, as illustrated in FIG. 11. The client is able to activate a link associated with the result to view details of the first classification evaluation of the freelancer. The client's onboarding dashboard is discussed elsewhere.

FIG. 12 illustrates an exemplary list of factors and associated factor values 1200 relating to the first classification evaluation in accordance with some embodiments. The first classification evaluation implements an algorithm that combines relevant factor values according to the list 1200, to formulate the score. For example, if the freelancer has had in the past 12 months, worked for more than 20 clients, then a factor value of −3 for the Client Count factor is combined with the values of other factors. The total score is mapped to one of the onboarding levels. Referring to FIG. 10, the first onboarding level is labeled as "independent contractor," the second onboarding level is labeled as "documentation needed" and the third onboarding level is labeled as "review required." In some embodiments, a score in the range of 0 and 5 is mapped to the first onboarding level, a score in the range of 6 and 7 is mapped to the second onboarding level, and a score in the range of 8 and above is mapped to the third onboarding level. In some embodiments, the classification engine does not require any input from the freelancer to perform the first classification evaluation of the freelancer. The classification engine automatically retrieves necessary information from the job data (e.g., job post), the freelancer data (e.g., freelancer profile, historical information of the freelancer that is determined by the services exchange medium) and the client data (e.g., client profile, historical information of the client that is determined by the services exchange medium). Alternatively, the classification engine may require additional input from the freelancer to perform the first classification evaluation of the freelancer.

As discussed above, onboarding associated with each of the second onboarding level and the third onboarding level is more rigorous than that associated with the first onboarding level. Still referring to FIG. 10, each onboarding level corresponds with a set of actions, wherein the set of actions can include one or more actions. For example, the set of actions corresponding to the first onboarding level requires no additional documentation or review as, based on the first classification evaluation, the freelancer can be positively classified by the classification engine as an independent contractor. The freelancer simply proceeds with standard onboarding, which includes one or more tasks that are established by the client for all of its engaged freelancers. For another example, the set of actions corresponding to the second onboarding level requires the freelancer, in addition to completing standard onboarding, to provide additional documentation to support the classification of the freelancer as an independent contractor. The freelancer is able to proceed with additional onboarding, which allows the freelancer to provide the additional documentation. For yet another example, the set of actions corresponding to the third onboarding level requires, in addition to the freelancer completing standard onboarding and providing additional documentation, the client, the freelancer or both to complete compliance questionnaires.

As discussed elsewhere, the client is able to configure onboarding tasks (e.g., add sections and tasks to each section) via an onboarding setup interface. In some embodiments, the client is able to configure the rigor of onboarding via the onboarding setup interface and, more specifically, via task configuration interfaces. From each of the task configuration interfaces, the client is able to select one of the onboarding levels that the corresponding task pertains to. FIG. 13 illustrates a graphical representation of task configuration interface 1300 in accordance with some embodiments. The task configuration interface 1300, which is activated from the onboarding setup interface, corresponds to a Client Questionnaire task. The selected onboarding level for the Client Questionnaire task is 3 (e.g., boxed area). In some embodiments, onboarding level 3 is the "review required" level. A selection is done for each task from the onboarding setup interface, such that the task is appropriately included as part of a freelancer's onboarding dashboard.

Figure 14A:
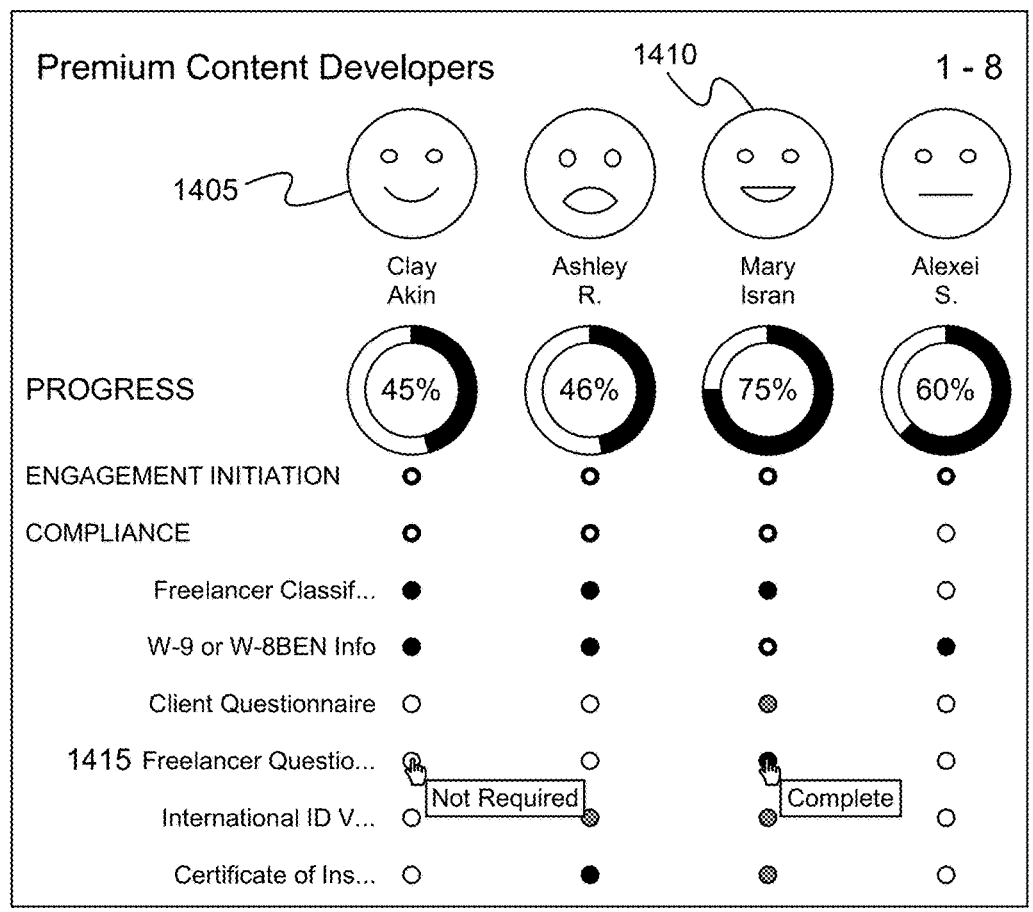
FIGS. 14A-14B illustrate other exemplary client views of an onboarding dashboard in accordance with some embodiments.
Figure 14B:
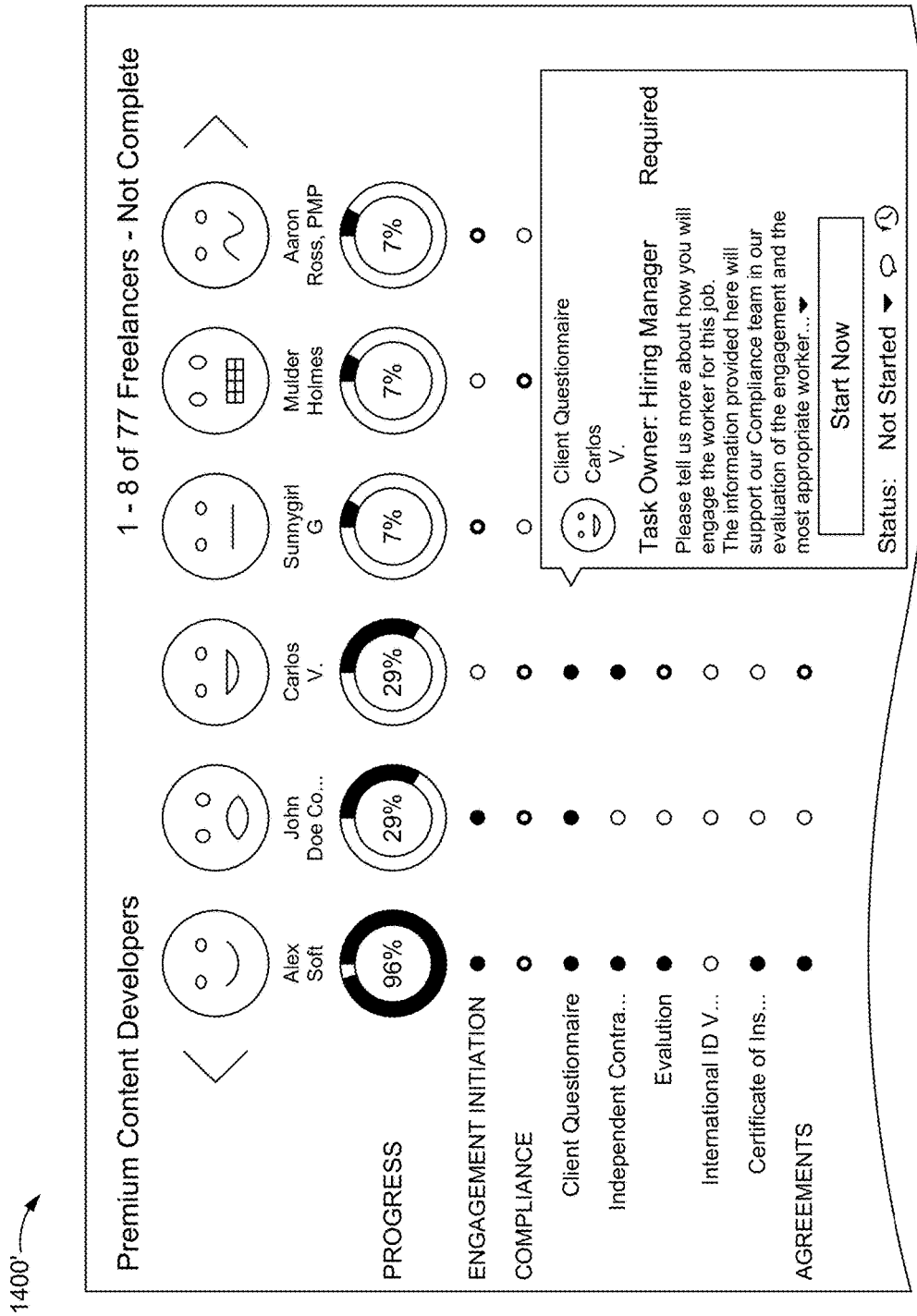

The first classification evaluation drives different levels of onboarding. FIG. 14A illustrates another exemplary client view of an onboarding dashboard 1400 in accordance with some embodiments. Based on the first classification evaluation, freelancers complete different levels of onboarding. For example, in FIG. 14A, user 1405 is not required to complete the Freelancer Questionnaire task 1415, while user 1410 is required to complete (which is shown as being completed) the Freelancer Questionnaire task 1415. As discussed elsewhere, a freelancer typically starts a task to be completed by the freelancer (e.g., Freelancer Questionnaire) by activating the task from the freelancer's onboarding dashboard. FIG. 15A illustrates an exemplary freelancer questionnaire form 1500 in accordance with some embodiments. Similarly, the client starts a task to be completed by the client (e.g., Client Questionnaire) by activating the task from the client's onboarding dashboard 1400', as illustrated in FIG. 14B. FIG. 15B illustrates an exemplary client questionnaire form 1550 in accordance with some embodiments. The questions presented in the forms 1500, 1550 of FIGS. 15A-15B pertain to facts and circumstances that are designed to assist in the second classification evaluation of whether the freelancer is a payrolled employee or an independent contractor.

Referring back to FIG. 10, the classification engine captures responses from the questionnaires to perform the second classification evaluation of the freelancer. In some embodiments, unlike the first classification evaluation, the second classification evaluation requires user input.

FIG. 16 illustrates an exemplary list of factors and associated factor values 1600 relating to the second classification evaluation in accordance with some embodiments. The responses from the questionnaires drive the classification decision. In some embodiments, the second classification evaluation implements an algorithm that takes a constant starting score (e.g., 100) and, based on the responses from the questionnaires, deducts from the starting score relevant factor values according to the list 1600, thereby resulting in a final score. For example, if the client responded in the questionnaire that training will be provided, then 5 will be deducted from the starting score. If the final score is below a predetermined threshold, then the free freelancer is classified by the classification engine as a payrolled employee. However, if the final score is above the predetermined threshold, then the freelancer is classified by the classification engine as a contractor.

The second classification evaluation can be coupled with legal review. In some embodiments, the legal review is manually performed by an entity within or outside of the services exchange medium. In some embodiments, the entity performs the legal review of any part or all parts of the submissions by the client and/or the freelancer (e.g., additional documents, responses to questionnaires, profiles, etc.). In some embodiments, the entity is able to communicate with the client and/or the freelancer to obtain more information.

From the second classification evaluation, with or without the legal review, the classification engine is able to positively classify the freelancer as an independent contractor or as a payrolled employee.

Figure 17:
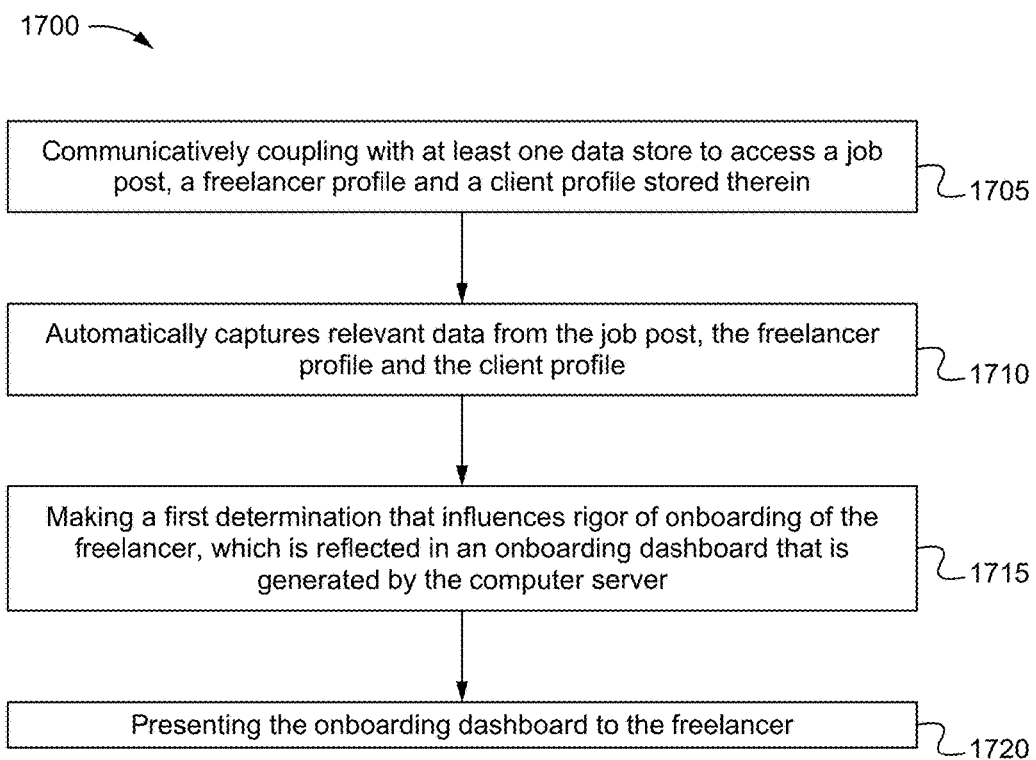
FIG. 17 illustrates an exemplary method in accordance with some embodiments.

FIG. 17 illustrates an exemplary method 1700 of implementing a classification engine in accordance with some embodiments. The method 1700 is typically performed by a computer server at a services exchange medium. At Step 1705, the computer server communicatively couples with at least one data store to access a job post, a freelancer profile and a client profile stored therein. The job post and the client profile are associated with a client and, in some embodiments, created by the client prior to the method 1700. The freelancer profile is associated with a freelancer and, in some embodiments, created by the freelancer prior to the method 1700. The job post pertains to a job that the client needs to be completed.

At Step 1710, the computer server automatically captures relevant data from the job post, the freelancer profile and the client profile.

At Step 1715, the computer server makes a first determination that influences rigor of onboarding of the freelancer, which is reflected in an onboarding dashboard that is generated by the computer server. The onboarding dashboard is personal to the freelancer as it includes tasks that have been established for the freelancer by the client.

In some embodiments, the computer server implements a first algorithm that computes a first score that is based on the captured data from the Step 1710, wherein the first determination from the Step 1715 is based on the first score. The first score is mapped to one of a plurality of onboarding levels. In some embodiments, onboarding associated with each of the plurality of onboarding levels is progressively more rigorous than onboarding associated with a previous onboarding level.

At Step 1720, the computer server presents the onboarding dashboard to the freelancer.

In some embodiments, when the first score is within a first range, the computer server is able to ascertain a classification of the freelancer (e.g., a contractor). However, when the first score is within a range that is different from the first range, the computer server obtains responses input by the freelancer, the client or both. The computer server then, according to at least a second determination, classify the freelancer in one of two categories (e.g., a contractor category and a payrolled employee category). In some embodiments, the computer server implements a second algorithm that computes a final score based on the responses, wherein the second determination is based on the final score. In some embodiments, the classification of the freelancer in one of the two categories is also based on legal review of at least a part of the responses. The legal review can be manually performed by an entity internally within or externally from the services exchange medium.

In some embodiments, the computer server allows the client, prior to the method 1700, to configure onboarding tasks such that each of the onboarding tasks either will or will not become a part of the freelancer's onboarding dashboard depending on the first score.

As demonstrated, the classification engine dramatically reduces the time it takes to onboard a freelancer engaged by a client. In some embodiments, the freelancer classification can be completed within minutes as opposed to weeks. In addition, the classification engine significantly reduces legal risk and inefficiencies. All compliance results are documented and stored and, therefore, are retrievable by clients from their onboarding dashboards.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system for optimizing performance and minimizing delays within a services exchange medium, the system comprising:
  at least one data store that together stores:
    a job post associated with a client;
    a freelancer profile associated with a freelancer; and
    a client profile associated with the client; and
  a computer server communicatively coupled with the at least one data store and configured to:
    establish a plurality of onboarding process flows configured by the client, wherein each of the plurality of onboarding process flows includes initial onboarding tasks that are specific to a position within the services exchange medium and also includes rules that define completion dependencies for the initial onboarding tasks;
    associate the freelancer with one of the plurality of onboarding process flows previously configured by the client;
    access from the at least one data store the job post, the freelancer profile, and the client profile;
    automatically capture data from the job post, the freelancer profile and the client profile;
    implement a first algorithm that computes a first score based on the captured data, wherein the first score is mapped to one of a plurality of onboarding levels;
    when the first score is within a first range, ascertain a classification of the freelancer without needing to request for input from the freelancer;
    when the first score is not within the first range, automatically influence rigor of the onboarding process that is associated with the freelancer by dynamically integrating additional onboarding tasks into the onboarding process, wherein data associated with the additional onboarding tasks that subsequently are received are used by the computer server to support the classification of the freelancer; and
    present the onboarding process flow that is associated with the freelancer in an onboarding dashboard for display on a viewing device, wherein the rules enforce an order of user inputs into the onboarding dashboard such that when a subsequent onboarding task that is dependent on at least one uncompleted onboarding task is activated, a task message for the subsequent onboarding task and reachable from the onboarding dashboard is displayed, wherein the task message displays the at least one uncompleted onboarding task that needs to be completed prior to starting the subsequent onboarding task, and wherein the task message is displayed while the at least one uncompleted onboarding task is not activated.

2. The system of claim 1, wherein onboarding associated with each of the plurality of onboarding levels is progressively more rigorous than onboarding associated with a previous onboarding level.

3. The system of claim 1, wherein, when the first score is within a range different from the first range, the computer server is also configured to:
  obtain responses input by at least one of the freelancer and the client; and
  according to at least a determination, classify the freelancer in one of a plurality of categories.

4. The system of claim 3, wherein the computer server is also configured to implement a second algorithm that computes a final score based on the responses.

5. The system of claim 4, wherein the determination is based on the final score.

6. The system of claim 5, wherein the classification of the freelancer in one of a plurality of categories is also based on a legal review.

7. The system of claim 6, wherein the plurality of categories includes a contractor category and a payrolled employee category.

8. A non-transitory computer-readable medium storing instructions that, when executed by a computing device, cause the computing device to perform a method of optimizing performance and minimizing delays within a services exchange medium, the method comprising:
  establishing a plurality of onboarding process flows configured by a client, wherein each of the plurality of onboarding process flows includes initial onboarding tasks that are specific to a position within the services exchange medium and also includes rules that define completion dependencies for the initial onboarding tasks;
  associating a freelancer with one of the plurality of onboarding process flows previously configured by the client;
  communicatively coupling with at least one data store to access a job post associated with the client, a freelancer profile associated with the freelancer, and a client profile associated with the client stored therein;
  automatically capturing data from the job post, the freelancer profile and the client profile;
  when a first score derived from the captured data is above a first threshold, automatically influencing rigor of the onboarding process that is associated with the freelancer by dynamically updating the onboarding process flow to include additional onboarding tasks to reflect ascertaining needs;
  when the first score is below the first threshold, classifying the freelancer in a first of two categories without needing to request for input from the freelancer; and
  presenting the onboarding process flow that is associated with the freelancer in an onboarding dashboard for display on a viewing device, wherein the rules enforce an order of user inputs into the onboarding dashboard such that when a subsequent onboarding task that is dependent on at least one uncompleted onboarding task is activated, a task message for the subsequent onboarding task and reachable from the onboarding dashboard is displayed, wherein the task message displays the at least one uncompleted onboarding task that needs to be completed prior to starting the subsequent onboarding task, and wherein the task message is displayed while the at least one uncompleted onboarding task is not activated.

9. The non-transitory computer-readable medium of claim 8, wherein when the first score is above a second threshold, the method further comprising:
  obtaining freelancer responses that are input by the freelancer;
  obtaining client responses that are input by the client;
  computing a second score derived from the freelancer responses and the client responses; and
  classifying the freelancer in one of the two categories based on the second score.

10. The non-transitory computer-readable medium of claim 9, wherein the classification of the freelancer in one of the two categories based on the second score is also based on legal review of at least one part of the freelancer responses and the client responses.

11. The non-transitory computer-readable medium of claim 8, wherein the method also includes:
  allowing the client to create the job post regarding a job and to create the client profile; and
  allowing the freelancer to create the freelancer profile.

12. The non-transitory computer-readable medium of claim 11, wherein the method also includes allowing the client to configure onboarding tasks such that each of the onboarding tasks either will or will not become a part of the freelancer's onboarding dashboard depending on the first score.

13. The non-transitory computer-readable medium of claim 12, wherein the method also includes allowing the client to configure task dependencies of the initial onboarding tasks.

14. The non-transitory computer-readable medium of claim 13, wherein the initial onboarding tasks associated with the freelancer's onboarding dashboard are based on the first score and a group the freelancer is assigned to by the client.

15. A non-transitory computer-readable medium storing instructions that, when executed by a computing device, cause the computing device to perform a method of optimizing performance and minimizing delays within a services exchange medium, the method comprising:
  generating a plurality of user interfaces together configured to:
    allow a client to create a job post regarding a job and to create a client profile, wherein the job post and the client profile are stored after creation;
    allow the client to configure an onboarding dashboard associated with the job, wherein the onboarding dashboard includes a plurality of onboarding tasks and a process flow of the plurality of onboarding tasks;
    allow a freelancer to create a freelancer profile, wherein the freelancer profile is stored after creation; and
    allow the freelancer to interact with the onboarding dashboard;
  communicatively coupling with at least one data store to access the job post, the freelancer profile and the client profile stored therein;

automatically capturing data from the job post, the freelancer profile and the client profile;

depending on a first score derived from the captured data, influencing rigor of onboarding the freelancer, which is reflected in the onboarding dashboard that is generated by the computer server to be personal to the freelancer;

when the first score is below a first threshold, ascertaining the freelancer in a first of two categories without needing to request for input from the freelancer;

only when the first score is not below the first threshold, automatically influencing rigor of the process flow by dynamically integrating additional onboarding tasks into the process flow, wherein data associated with the additional onboarding tasks that are subsequently received are used to support a classification inquiry; and presenting the user interface for the onboarding dashboard on a viewing device, wherein the onboarding dashboard provides visibility of onboarding progress of the freelancer and pinpoints issues in the onboarding progress, wherein the rules enforce an order of user interactions with the onboarding dashboard such that when a subsequent onboarding task that is dependent on at least one uncompleted onboarding task is activated, a task message for the subsequent onboarding task and reachable from the onboarding dashboard is displayed, wherein the task message displays the at least one uncompleted onboarding task that needs to be completed prior to starting the subsequent onboarding task, and wherein the task message is displayed while the at least one uncompleted onboarding task is not activated.

* * * * *